(12) United States Patent
Melzer et al.

(10) Patent No.: US 11,016,171 B2
(45) Date of Patent: May 25, 2021

(54) RADAR SENSING WITH PHASE CORRECTION

(71) Applicant: Infineon Technologies AG, Neubiberg (DE)

(72) Inventors: Alexander Melzer, Neutillmitsch (AT); Mario Huemer, Alkoven (AT); Paul Meissner, Feldkirchen bei Graz (AT); Fisnik Sulejmani, Linz (AT); Matthias Wagner, Engerwitzdorf (AT)

(73) Assignee: Infineon Technologies AG

( * ) Notice: Subject to any disclaimer, the term of this patent is extended or adjusted under 35 U.S.C. 154(b) by 300 days.

(21) Appl. No.: 16/266,523

(22) Filed: Feb. 4, 2019

(65) Prior Publication Data

US 2019/0242972 A1   Aug. 8, 2019

(30) Foreign Application Priority Data

Feb. 8, 2018   (DE) .......................... 102018102816.4

(51) Int. Cl.
*G01S 7/292* (2006.01)
*G01S 13/93* (2020.01)
(Continued)

(52) U.S. Cl.
CPC ............ *G01S 7/2923* (2013.01); *G01S 7/023* (2013.01); *G01S 7/35* (2013.01); *G01S 7/354* (2013.01); *G01S 7/36* (2013.01); *G01S 7/40* (2013.01); *G01S 13/12* (2013.01); *G01S 13/34* (2013.01); *G01S 13/343* (2013.01); *G01S 13/534* (2013.01); *G01S 13/93* (2013.01); *G01S 13/931* (2013.01); *G01S 2007/356* (2013.01)

(58) Field of Classification Search
CPC ........ G01S 13/12; G01S 13/34; G01S 13/343; G01S 13/534; G01S 13/93; G01S 13/931; G01S 2007/356; G01S 7/023; G01S 7/2923; G01S 7/35; G01S 7/354; G01S 7/36; G01S 7/40
See application file for complete search history.

(56) References Cited

U.S. PATENT DOCUMENTS

| 10,502,824 B2 | 12/2019 | Roger et al. |
| 2011/0102258 A1 | 5/2011 | Underbrink et al. |

(Continued)

FOREIGN PATENT DOCUMENTS

| DE | 102012021239 A1 | 4/2014 |
| KR | 20170058279 A | 5/2017 |

*Primary Examiner* — Timothy X Pham
(74) *Attorney, Agent, or Firm* — Design IP

(57) ABSTRACT

A radar method is described herein. In accordance with one embodiment the method includes receiving a plurality of chirp echoes of transmitted radar signals, generating a digital signal based on the plurality of chirp echoes, and calculating a range map based on the digital signal. The range map includes a plurality of values, each value is represented by an amplitude value and a phase value, and each value is associated with one frequency bin of a set of frequency bins and one chirp echo of the plurality of chirp echoes. The method further includes identifying chirp echoes which are affected by interference and determining, for one or more selected frequency bins, corrected phase values based on phase values that are associated with chirp echoes not identified as affected by interference.

18 Claims, 11 Drawing Sheets

(51) Int. Cl.
*G01S 13/34* (2006.01)
*G01S 13/931* (2020.01)
*G01S 7/35* (2006.01)
*G01S 7/02* (2006.01)
*G01S 7/36* (2006.01)
*G01S 7/40* (2006.01)
*G01S 13/12* (2006.01)
*G01S 13/534* (2006.01)

(56) References Cited

U.S. PATENT DOCUMENTS

| | | | |
|---|---|---|---|
| 2015/0301157 A1* | 10/2015 | Ossowska | G01S 7/023 |
| | | | 342/173 |
| 2016/0084941 A1* | 3/2016 | Arage | G01S 13/584 |
| | | | 342/91 |
| 2016/0161601 A1* | 6/2016 | Sebastian | G02B 26/06 |
| | | | 356/5.1 |
| 2019/0187246 A1* | 6/2019 | Behrens | G01S 7/354 |
| 2020/0124699 A1* | 4/2020 | Meissner | G01S 13/34 |

* cited by examiner

Range Map $R(n,m) = A_{n,m} \cdot e^{j\varphi_{n,m}}$

| | chirp # 0 | chirp # 1 | chirp # 2 | ... |
|---|---|---|---|---|
| smooth → bin # 0 | $A'_{0,0}$ | $A'_{0,1}$ | $A'_{0,2}$ | ... |
| smooth → bin # 1 | $A'_{1,0}$ | $A'_{1,1}$ | $A'_{1,2}$ | ... |
| smooth → bin # 2 | $A'_{2,0}$ | $A'_{2,1}$ | $A'_{2,2}$ | ... |
| ⋮ | ⋮ | ⋮ | ⋮ | ⋱ |
| smooth → bin # n | $A'_{n,0}$ | $A'_{n,1}$ | $A'_{n,2}$ | ... |
| ⋮ | ⋮ | ⋮ | ⋮ | ⋱ |
| smooth → bin # N-2 | $A'_{N-2,0}$ | $A'_{N-2,1}$ | $A'_{N-2,2}$ | ... |
| smooth → bin # N-1 | $A'_{N-1,0}$ | $A'_{N-1,1}$ | $A'_{N-1,2}$ | ... |

↓ frequency axis (b)

| | chirp # 0 | chirp # 1 | chirp # 2 | ... |
|---|---|---|---|---|
| min → bin # 0 | $A_{min,0}$ | $A_{min,0}$ | $A_{min,0}$ | ... |
| min → bin # 1 | $A_{min,1}$ | $A_{min,1}$ | $A_{min,1}$ | ... |
| min → bin # 2 | $A_{min,2}$ | $A_{min,2}$ | $A_{min,2}$ | ... |
| ⋮ | ⋮ | ⋮ | ⋮ | ⋱ |
| min → bin # n | $A_{min,n}$ | $A_{min,n}$ | $A_{min,n}$ | ... |
| ⋮ | ⋮ | ⋮ | ⋮ | ⋱ |
| min → bin # N-2 | $A_{min,N-2}$ | $A_{min,N-2}$ | $A_{min,N-2}$ | ... |
| min → bin # N-1 | $A_{min,N-1}$ | $A_{min,N-1}$ | $A_{min,N-1}$ | ... |

↓ frequency axis

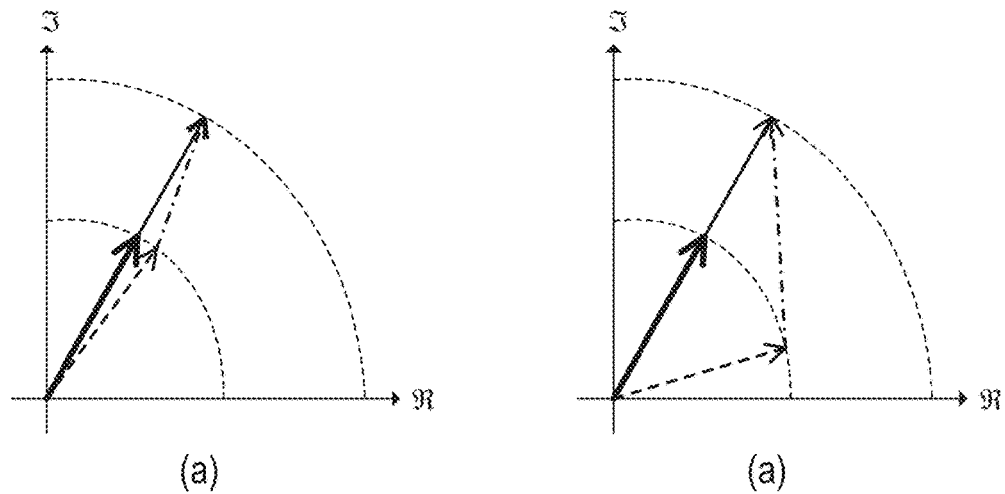

(a)     (a)

- - - - → target          ⎯⎯→ target and interferer
- · - · → interferer      ⟹ target with interference suppression

Fig. 16

RADAR SENSING WITH PHASE CORRECTION

FIELD

The present disclosure relates to the field of radar sensors, and, in particular, to radar sensing techniques with interference suppression.

BACKGROUND

Radar sensors can be found in numerous sensing applications in which distances and velocities of objects are to be measured. In the automotive sector, there is an increasing demand for radar sensors that may be used in so-called advanced driver-assistance systems (ADAS). Examples of an advanced driver assistive system are "adaptive cruise control" (ACC) and "radar cruise control" systems. Such systems may be used to automatically adjust the speed of an automobile so as to maintain a safe distance from other automobiles driving ahead. Another example of an advanced driver assistive system are blind-spot monitors, which may employ radar sensors to detect other vehicles in the blind spot of a vehicle. Particularly autonomous cars may use numerous sensors, such as radar sensors, to detect and locate various objects in their surroundings. Information about the position and velocity of objects in the area of an autonomous car is used to help navigate safely.

Modern radar systems make use of highly integrated RF circuits which may incorporate all core functions of an RF font-end of a radar transceiver in one single package (single chip transceiver). Such RF front-ends usually include, inter alia, a local RF oscillator (LO), power amplifiers (PA), low-noise amplifiers (LNA), and mixers. Frequency-modulated continuous-wave (FMCW) radar systems use radar signals whose frequency is modulated by ramping the signal frequency up and down. Such radar signals are often referred to as "chirp signals" or simply as chirps. A radar sensor usually radiates sequences of chirps using one or more antennas, and the radiated signal is backscattered by one or more objects (referred to as radar targets) located in the "field of view" of a radar sensor. The backscattered signals (radar echoes) are received and processed by the radar sensor. The detection of the radar targets is usually accomplished using digital signal processing.

As more and more automobiles are being equipped with radar sensors, interference is becoming an issue. That is, the radar signal radiated by a first radar sensor (installed in one automobile) may intersperse to the reception antenna of a second radar sensor (installed in another automobile) and impair the operation of the second radar sensor.

SUMMARY

A radar method is described herein. In accordance with one embodiment the method includes receiving a plurality of chirp echoes of transmitted radar signals, generating a digital signal based on the plurality of chirp echoes, and calculating a range map based on the digital signal. The range map includes a plurality of values, each value is represented by an amplitude value and a phase value, and each value is associated with one frequency bin of a set of frequency bins and one chirp echo of the plurality of chirp echoes. The method further includes identifying chirp echoes which are affected by interference and determining, for one or more selected frequency bins, corrected phase values based on phase values that are associated with chirp echoes not identified as affected by interference.

Furthermore, a radar device is described herein. In accordance with one embodiment the radar device includes a radar receiver that is configured to receive a plurality of chirp echoes of transmitted radar signals and to generate a digital signal based on the plurality of chirp echoes. The radar device further includes a computing unit that is configured to calculate a range map based on the digital signal, wherein the range map includes a plurality of values, each value is represented by an amplitude value and a phase value, and each value is associated with one frequency bin of a set of frequency bins and one chirp echo of the plurality of chirp echoes. The computing unit is further configured to identify chirp echoes which are affected by interference and to determine, for one or more selected frequency bins, corrected phase values based on phase values that are associated with chirp echoes not identified as affected by interference.

BRIEF DESCRIPTION OF THE DRAWINGS

The invention can be better understood with reference to the following drawings and descriptions. The components in the figures are not necessarily to scale; instead emphasis is placed upon illustrating the principles of the invention. In the figures, like reference numerals designate corresponding parts. In the drawings:

FIG. 15 illustrates the smoothing of the magnitudes included in the range map of FIG. 13.

FIG. 16 illustrates examples of how the phase of the spectral values included in the range map of FIG. 13 may be distorted due to interference.

DETAILED DESCRIPTION

Figure 1:
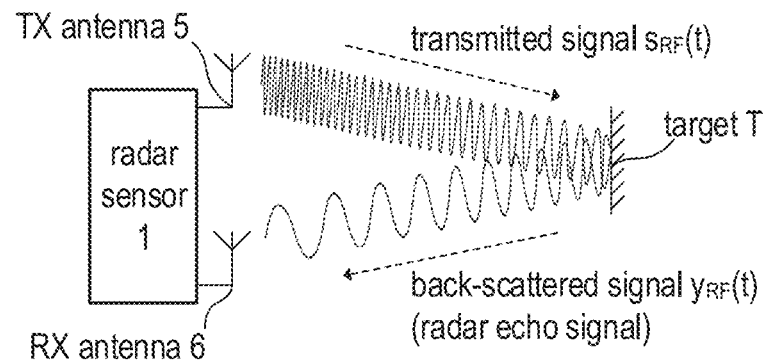
FIG. 1 is a sketch illustrating the operating principle of an FMCW radar system for distance and/or velocity measurement.

FIG. 1 illustrates a conventional frequency-modulated continuous-wave (FMCW) radar sensor 1. In the present example, separate transmission (TX) and reception (RX) antennas 5 and 6, respectively, are used (bistatic or pseudo-monostatic radar configuration). However, it is noted that a single antenna can be used, so that the reception antenna and the transmission antenna will be physically the same (monostatic radar configuration). The transmission antenna 5 continuously radiates an RF signal $s_{RF}(t)$, which is frequency-modulated, for example, by a saw-tooth signal (periodic linear ramp signal). The radiated signal $s_{RF}(t)$ is back-scattered at an object T, which is located in the radar channel within the measurement range of the radar device, and the back-scattered signal $y_{RF}(t)$ is received by the reception antenna 6. The object T is usually referred to as radar target. In a more general example, more than one target may be in the field of view of a radar sensor, and an antenna array may be used instead of a single RX antenna. Similarly, an antenna array may be used instead of a single TX antenna. Using antenna arrays allows for the measurement of the angle of incidence of a radar echo, usually referred to as direction of arrival (DoA). Measurement of the direction of arrival is important for many applications, and thus most radar sensors will make use of antenna arrays. To keep the drawings simple, only one TX antenna and one RX antenna are shown in the figures. It is understood that the concepts described herein are readily applicable to radar sensors with antenna arrays.

Figure 2:
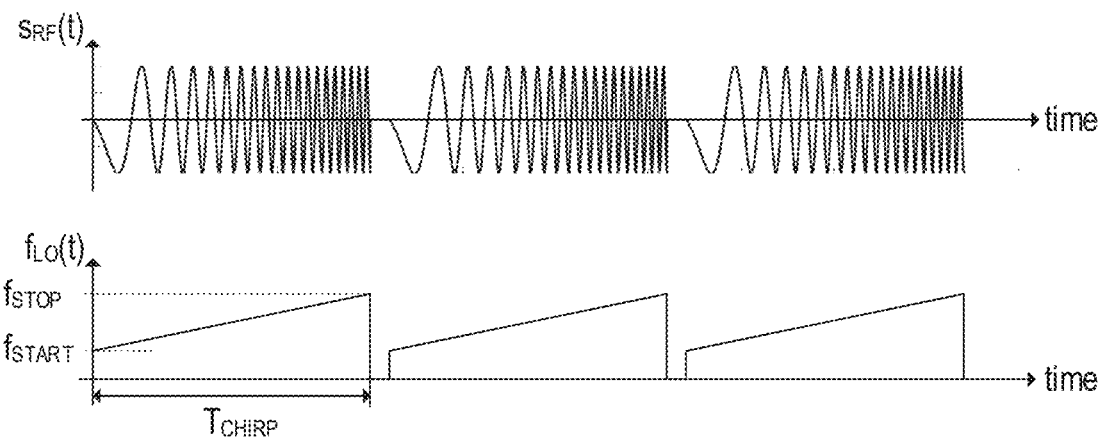
FIG. 2 includes two timing diagrams illustrating the frequency modulation of the RF signal used in FMCW radar systems.

FIG. 2 illustrates the mentioned frequency-modulation of the signal $s_{RF}(t)$. As shown in the first diagram of FIG. 2, the signal $s_{RF}(t)$ is composed of a series of "chirps", i.e. a sinusoidal waveform with increasing (up-chirp) or decreasing (down-chirp) frequency. In the present example, the instantaneous frequency $f_{LO}(t)$ of a chip increases linearly from a start frequency $f_{START}$ to a stop frequency $f_{STOP}$ within a defined time span $T_{CHIRP}$ (see second diagram of FIG. 2). Such a chirp is also referred to as a linear frequency ramp. Three identical linear frequency ramps are illustrated in FIG. 2. It is noted, however, that the parameters $f_{START}$, $f_{STOP}$, $T_{CHIRP}$ as well as the pause between the individual frequency ramps may vary dependent on the actual implementation of the radar device 1. In practice the frequency variation may be, for example, linear (linear chirp, frequency ramp), exponential (exponential chirp) or hyperbolic (hyperbolic chirp).

Figure 3:
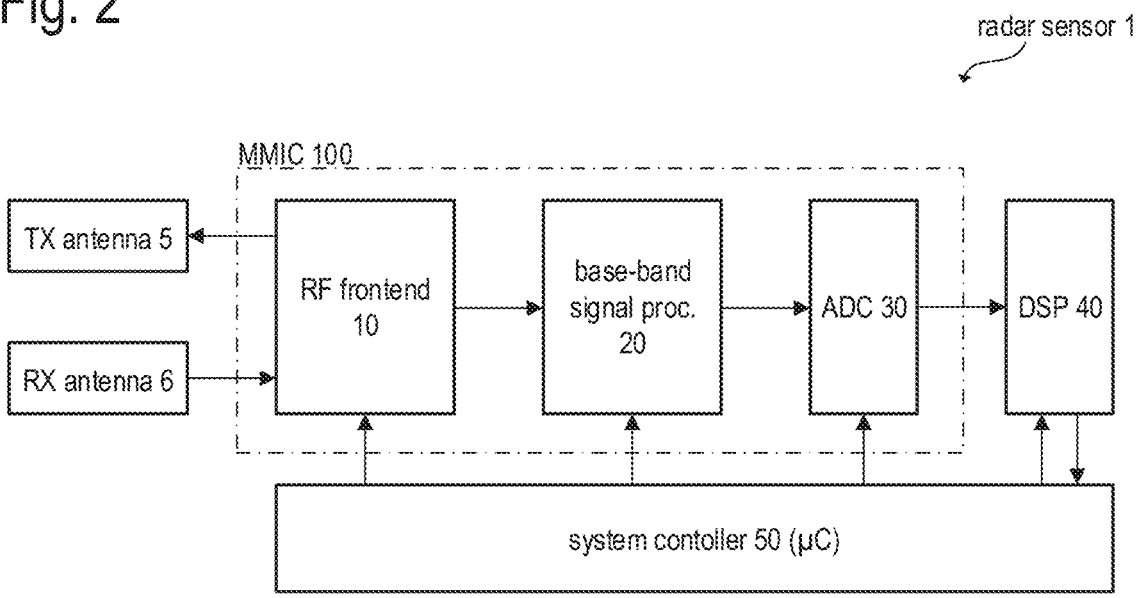
FIG. 3 is a block diagram illustrating the basic structure of an FMCW radar device.

FIG. 3 is a block diagram that illustrates an exemplary structure of radar sensor 1. Accordingly, at least one transmission antenna 5 (TX antenna(s)) and at least one reception antenna 6 (RX antenna(s)) are connected to an RF frontend 10, which may be integrated in a semiconductor chip, usually referred to as monolithic microwave integrated circuit (MMIC). The RF frontend 10 may include all the circuit components needed for RF signal processing. Such circuit components may include, for example, a local oscillator (LO), RF power amplifiers, low noise amplifiers (LNAs), directional couplers such as rat-race-couplers and circulators, and mixers for the down-conversion of RF signals (e.g. the received signal $y_{RF}(t)$, see FIG. 1) into the base-band or IF-band. As mentioned, antenna-arrays may be used instead of single antennas. The depicted example shows a bistatic (or pseudo-monostatic) radar system, which has separate RX and TX antennas. In case of a monostatic radar system, a single antenna or a single antenna array may be used for both, receiving and transmitting electromagnetic (radar) signals. In this case a directional coupler (e.g. a circulator) may be used to separate RF signals to be transmitted to the radar channel from RF signals received from the radar channel.

In the case of a frequency-modulated continuous-wave (FMCW) radar sensor, the RF signals radiated by the TX antenna 5 may be in the range between approximately 20 GHz (e.g. 24 GHz) and 81 GHz (e.g. about 77 GHz in automotive applications). As mentioned, the RF signal received by the RX antenna 6 includes the radar echoes, i.e. the signals that have been back-scattered at the radar target(s). The received RF signal $y_{RF}(t)$ is down-converted into the base band and further processed in the base-band using analog signal processing (see FIG. 3, base-band signal processing chain 20), which basically includes filtering and amplification of the base-band signal. The base-band signal is finally digitized using one or more analog-to-digital converters 30 and further processed in the digital domain (see FIG. 3, digital signal processing chain implemented, e.g., in digital signal processor 40). The overall system is controlled by a system controller 50, which may be at least partly implemented using a processor executing appropriate firmware. The processor may be included, e.g. in a microcontroller a digital signal processor, or the like. The digital signal processor 40 (DSP) may be part of the system controller 50 or separate therefrom. The RF frontend 10 and the analog base-band signal processing chain 20 (and optionally the ADC 30) may be integrated in a single MMIC. However, the components may be distributed among two or more integrated circuits.

Figure 4:
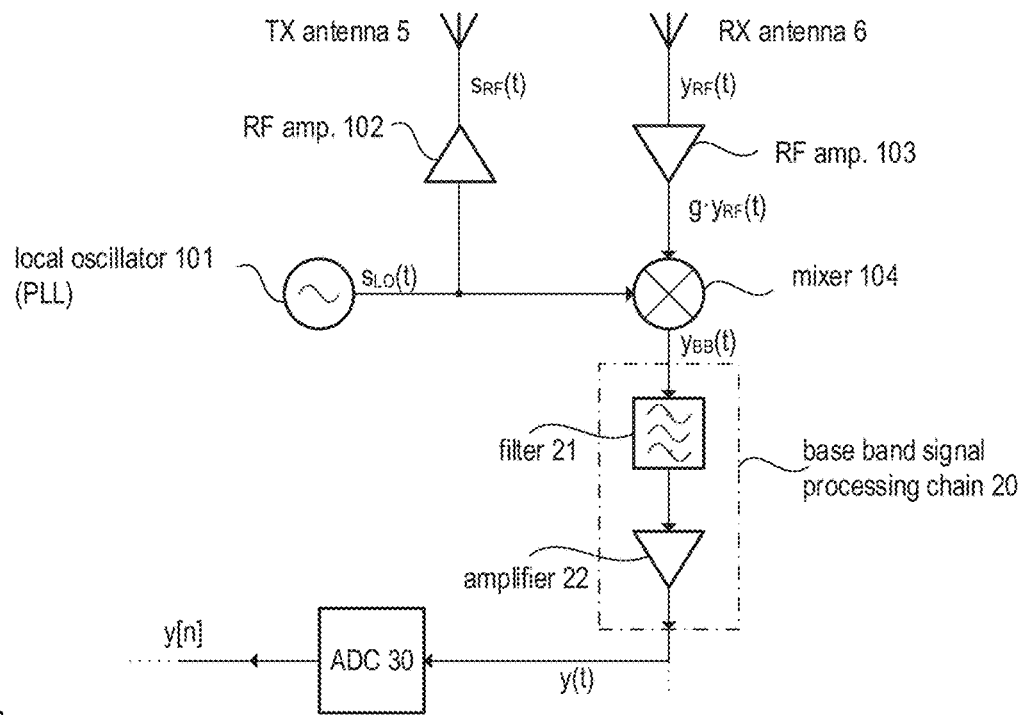
FIG. 4 is a circuit diagram illustrating one example of an analog RF frontend, which may be included in the FMCW radar device of FIG. 3.

FIG. 4 illustrates one exemplary implementation of the RF frontend 10, which may be included in the radar sensor shown in FIG. 3. It is noted that FIG. 4 is a simplified circuit diagram illustrating the basic structure of an RF frontend. Actual implementations, which may heavily depend on the application, are of course more complex. The RF frontend 10 includes a local oscillator (LO) 101 that generates a RF signal $s_{LO}(t)$, which may be frequency-modulated as explained above with reference to FIG. 2. The signal $s_{LO}(t)$ is also referred to as LO signal). In radar applications, the LO signal is usually in the SHF (Super High Frequency) or the EHF (Extremely High Frequency) band, e.g. between 76 GHz and 81 GHz in automotive applications.

The LO signal $s_{LO}(t)$ is processed in the transmit signal path as well as in the receive signal path. The transmit signal $s_{RF}(t)$, which is radiated by the TX antenna 5, is generated by amplifying the LO signal $s_{LO}(t)$, e.g., using an RF power amplifier 102. The output of the amplifier 102 is coupled to the TX antenna 5 e.g. via strip lines, a coupler, matching network, etc. The received signal $y_{RF}(t)$, which is provided by the RX antenna 6, is provided to a mixer 104. In the present example, the received signal $y_{RF}(t)$ (i.e. the antenna signal) is pre-amplified by RF amplifier 103 (e.g. a low-noise amplifier with gain g), so that the mixer receives the amplified signal $g \cdot y_{RF}(t)$ at its RF input. The mixer 104 further receives the LO signal $s_{LO}(t)$ at its reference input and is configured to down-convert the amplified signal $g \cdot y_{RF}(t)$ into the base band. The resulting base-band signal at the mixer output is denoted as $y_{BB}(t)$. The base-band signal $y_{BB}(t)$ is further processed by the analog base band signal processing chain 20 (see also FIG. 3), which basically includes one or more filters (e.g. a band-pass 21) to remove undesired side bands and image frequencies as well as one or more amplifiers such as amplifier 22). The analog output signal, which may be supplied to an analog-to-digital converter (cf. FIG. 3) is denoted as $y(t)$.

In the present example, the mixer 104 down-converts the RF signal $g \cdot y_{RF}(t)$ (amplified antenna signal) into the base band. The respective base band signal (mixer output signal) is denoted by $y_{BB}(t)$. The down-conversion may be accomplished in a single stage (i.e. from the RF band into the base band) or via one or more intermediate stages (from the RF band into an IF band and subsequently into the base band). The analog output signal $y(t)$ may be digitized using analog-to-digital converter 30 (see FIG. 3, not shown in FIG. 4), and the respective digital output signal is denoted as $y[n]$. This signal is also referred to as digital radar signal.

Figure 5:
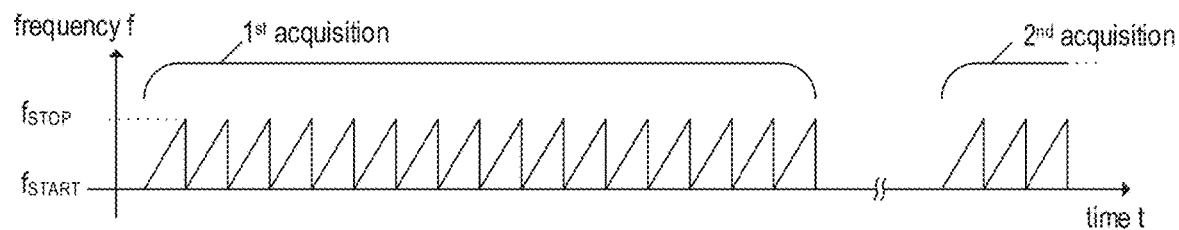
FIG. 5 is a timing diagram illustrating a sequence of chirps used for data acquisition in a radar sensor.
Figure 6:
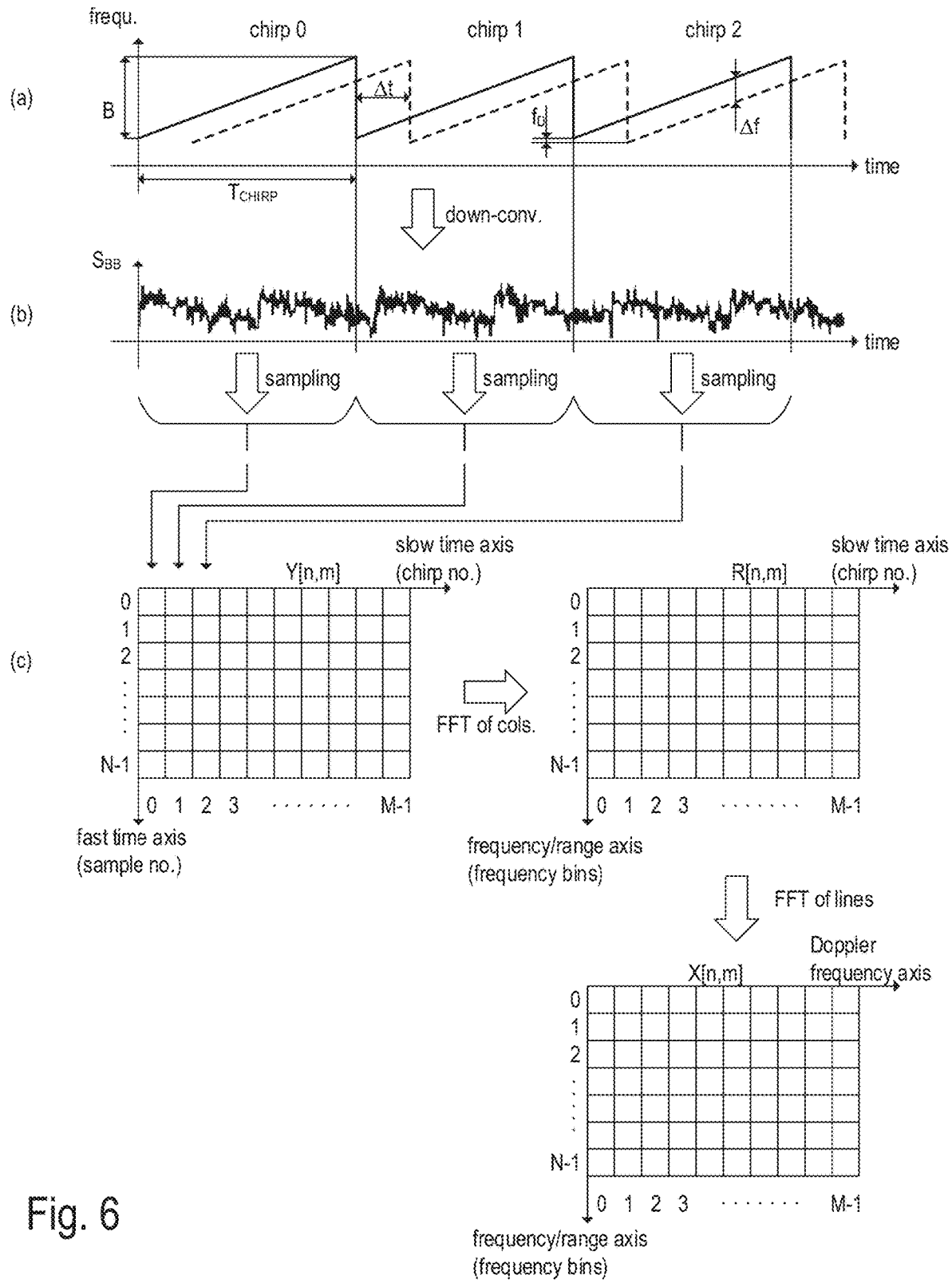
FIG. 6 illustrates the concept of Range Doppler Signal Processing commonly used in radar sensors.

FIG. 5 schematically illustrates an exemplary FM scheme as is commonly implemented in FMCW radar sensors. In the depicted example, a sequence of sixteen up-chirps is transmitted for one data acquisition. It is noted that, in practice, a chirp sequence usually includes many more chirps (e.g. 256 chirps) and the present example has been simplified for illustration purposes only. One exemplary signal processing method for evaluating the radar echoes is illustrated in FIG. 6. The depicted signal processing scheme is usually referred to as Range/Doppler processing and commonly used in radar sensors to detect radar targets in the range/velocity domain represented by a so-called Range/Doppler Map (see FIG. 6).

FIG. 6 illustrates the measurement principle used by a FMCW radar sensor that radiates a frequency modulated radar signal, which is modulated using a saw-tooth-shaped modulation signal. Diagram (a) of FIG. 6 illustrates frequency over time of an outgoing radar signal (solid line, cf. FIG. 4, signal $s_{RF}(I)$ and the respective incoming radar signal (dashed line, cf. FIG. 4, signal $y_{RF}(t)$). Accordingly, the frequency of the outgoing radar signal linearly increases from a start frequency $f_{START}$ to a stop frequency $f_{STOP}$ (chirp no. 0), then falls back to $f_{START}$ and again increases until the stop frequency $f_{STOP}$ is reached (chirp no. 1), and so on. As mentioned before with reference to FIG. 5, the outgoing radar signal is composed of a sequence of "frequency ramps" also referred to as "chirp pulses" or "chirps". Dependent on the application, a defined modulation pause may be inserted between two contiguous chirps, wherein the radar signal may remain at the stop frequency or the start frequency during the pause (or any frequency between stop and start frequency). The duration $T_{CHIRP}$ of one chirp may be in the range from a few microseconds up to a few milliseconds, e.g. 20 μs to 2000 μs. The actual values may be, however, greater or lower dependent on the application.

The incoming radar signal (received by an RX antenna) lags, with respect to the outgoing radar signal (radiated by the antenna), by a time lag Δt due to the travel time of the radar signal from the TX antenna to the radar target (at which the radar signal is back-scattered) and back to the RX antenna. The time lag Δt is often referred to as round trip delay RTD. The distance $d_T$ of the radar target from the radar sensor is $d_T = c \cdot \Delta t/2$, i.e., the speed of light c times half of the time lag Δt. As can be seen from FIG. 6, diagram (a), the time lag Δt results in a frequency shift Δf, which can be determined by down-mixing the incoming signal (see FIG. 4, mixer 104, diagram (b) of FIG. 6), digitizing the base-band signal, and performing a subsequent digital spectral analysis; the frequency shift appears as beat frequency in the base-band signal. When using a linear chirp (i.e. a saw-tooth-shaped modulation signal) the time lag Δt can be calculated as $\Delta t = \Delta f/k$, wherein the factor k is the steepness of the frequency ramp, which can be calculated as $k = (f_{STOP} - f_{START})/T_{CHIRP}$.

Although the basic operation principle of a FMCW radar sensor has been outlined above, it should be noted that more sophisticated signal processing may be applied in practice. In particular, an additional frequency shift $f_D$ of the incoming signal due to the Doppler effect may cause an error in the distance measurement, because the Doppler shift $f_D$ adds to the frequency shift Δf, which is due to the travel time Δt (round trip delay RTD) of the radar signal, as explained above. Dependent on the application, the Doppler shift may also be estimated from the outgoing and incoming radar signals, whereas, in some applications, the Doppler shift may be negligible for distance measurement. This may, in particular, be the case when the chirp duration $T_{CHIRP}$ is short, so that the frequency shift Δf will be high as compared with the Doppler shift $f_D$ for any distance within the measuring range of the radar sensor. In the present example, the frequency of the radar signal increases from $f_{START}$ to $f_{STOP}$, which results in a so-called "up-chirps". However, the same measurement techniques can be applied with "down-chirps", that is when the stop frequency $f_{STOP}$ is lower than the start frequency $f_{START}$ and the frequency decreases from $f_{START}$ to $f_{STOP}$ during a chirp. In some radar systems, the Doppler shift may be eliminated, when the distance is calculated based on an "up-chirp" and on a "down-chirp". Theoretically, the actual measured distance $d_T$ of a radar target can be calculated as the average of a distance value obtained from the up-chirp echo and a distance value obtained from the down-chirp echo; by means of the averaging the Doppler shift is cancelled out.

One exemplary standard signal processing technique of digital FMCW radar signals (see FIG. 3, DSP 40) includes the calculation of Range-Doppler Maps (also referred to as Range-Doppler Images). Generally, linear FMCW radars obtain target information (i.e. distance, angle, and velocity of a radar targets) by transmitting a sequence of linear chirps and mixing (down-converting) the delayed echoes (see FIG. 4, signal $y_{RF}(t)$) from the targets with a copy of the transmitted signal (see FIG. 4, mixer 104) as illustrated in diagram (b) of FIG. 6. The target range information (i.e. the distance between sensor and a radar target) can be extracted from the spectrum of this down-converted signal. A Range-Doppler map can be obtained, e.g., by a two-stage Fourier transformation as described below in more detail. Range-Doppler maps can be used as a basis for various target detection, identification and classification algorithms.

As indicated above, the distance $d_T$ of the radar target from the radar sensor may be calculated as $$d_T = c \cdot \Delta f \cdot T_{CHIRP}/(2 \cdot B), \quad (1)$$

wherein $\Delta f$ denotes the beat frequency and B the bandwidth of the chirp ($B=|f_{STOP}-f_{START}|$). Accordingly, the basic signal processing of linear FMCW radar involves determining the beat frequency by spectral analysis. When the radar target is moving, the Doppler effect has to be considered in order to determine the radar target's velocity (relative to the radar sensor). This can be done based on the mentioned Range-Doppler maps, which can be calculated using so-called Range-Doppler Processing. In the examples depicted herein a digital signal processor is used as computing unit to perform the calculations needed to obtain the range map. It is noted, however, that the required computations may be performed by various hardware and software entities and combinations thereof, and generally, the terms computing unit and processor cover any hardware or software entity or combinations thereof that is capable and configured to execute the calculations described in connection with the embodiments described herein.

The common method for calculating the Range-Doppler maps includes two steps, wherein each step includes the calculation of several Fourier Transforms, usually implemented using a Fast Fourier Transform (FFT) algorithm. For the following example, it is assumed that the digital radar signal y[n] provided by the ADC 30 (see FIG. 4) includes N×M samples representing M chirps, wherein each chirp is composed of N samples (sampling time interval $T_{SAMPLE}$). These N×M samples may be arranged in a two-dimensional array Y[n, m] (see diagram (c) of FIG. 6) with N lines and M columns. Each column of the array Y[n, m] represents one chirp. The $n^{th}$ line of the array Y[n, m] includes the $n^{th}$ sample of each chirp. The line index n may also be seen as discrete time values $n \cdot T_{SAMPLE}$ on a "fast" time axis. Similarly, the column index m (chirp number) may be seen as discrete time values $m \cdot T_{CHIRP}$ on a "slow" time axis.

In a first stage, a first FFT (usually referred to as Range FFT) is applied to each chirp. That is, the FFT is calculated for each one of the M columns of the array Y[n, m]. In other words, the FFT is applied to the matrix Y[n, m] along the "fast" time axis. The resulting Fourier transforms can also be arranged in a two-dimensional array, referred to as range map R[n, m], wherein the M columns include the Fourier transforms of the M chirps. Each one of the N lines includes the (complex valued) spectral values for a specific discrete frequency value (often referred to as frequency bin). The range map R[n, m] is illustrated in diagram (c) of FIG. 6. A radar echo from a target will result in a peak appearing at (or near) a specific frequency bin. Usually the peak will appear in all columns, i.e. in all (Fourier transformed) chirps. The frequency value of the frequency bin can be converted into range information, e.g. according to eqn. (1).

In a second stage, a second FFT (usually referred to as Doppler FFT) is applied to each one of the N lines of the range map R[n, m]. Each line includes the M spectral values of the M chirps for a specific frequency bin, wherein each frequency bin corresponds to a specific range/distance of a radar target. In other words, the FFT is applied to the range map R[n, m] along the "slow" time axis. The resulting Fourier transforms can also be arranged in a two-dimensional array, referred to as Range/Doppler Map X[n, m]. A radar echo from a target will result in a peak appearing in a specific position of the Range/Doppler Map X[n, m]. The line number $n \in [0, \ldots, N-1]$ in which the peak appears represents the frequency bin, and the respective frequency value can be converted into range information, e.g. according to eqn. (1). The column number $m \in [0, \ldots, M-1]$ in which the peak appears represents the Doppler frequency (frequency shift due to the Doppler effect) that can be converted into velocity information. In the case of more than one RX antenna, a Range/Doppler Map $X_a[n, m]$ may be calculated for each antenna, wherein $\alpha$ denotes the index of the respective RX antenna ($a=0, 1, \ldots A-1$, A denoting the number of RX antennas). The A Range/Doppler Maps $X_a[n, m]$ may be stacked to a three-dimensional array, sometimes referred to as "radar data cube". It is understood that the parameters N and M may be equal but, in general, will be different.

As mentioned, the range maps R[n, m], the Range-Doppler Maps X[n, m] or the radar data cubes may be used as input data for various signal processing techniques to detect radar targets in the surrounding (field of view) of the radar sensor. For example, various peak detection algorithms are known for detecting peaks (i.e. local maxima, FFT peaks) in the range map or the Range/Doppler Map caused by objects (radar targets) in the radar channel. That is, a target may be detected if a value in the range map or the range doppler map exceeds a specific threshold. However, more complex detection algorithms may also be used. Additional signal processing steps are performed to obtain, from the detected FFT peaks, a list of radar targets.

As does any measured data, the spectral values in the Range/Doppler Maps include noise. Thus, the detectability of FFT peaks and the reliability of detected peaks depend on the noise floor. Various noise sources may contribute to the noise floor, particularly the phase noise of the local oscillator (see FIG. 4, oscillator 101). Another phenomenon that occurs when more radar sensors of the same or a similar type are operated in the same environment (e.g. the same portion of a road) is interference. In this case the signal received by the RX antenna(s) of a radar sensor not only includes radar echoes and noise, but also signals radiated by one or more other radar sensors operating in the same frequency range and interspersed to the RX antenna(s). When considering a specific radar sensor, any other radar sensor operated in the same environment is a potential interferer and the radar signals radiated by one or more interferers are referred to as interference signals. Interference signals received by the RF frontend of a radar sensor superpose on the radar echoes caused by real targets and may at least temporarily increase the overall noise floor to values so high that detection of radar targets becomes impossible or at least prone to error.

Figure 7:
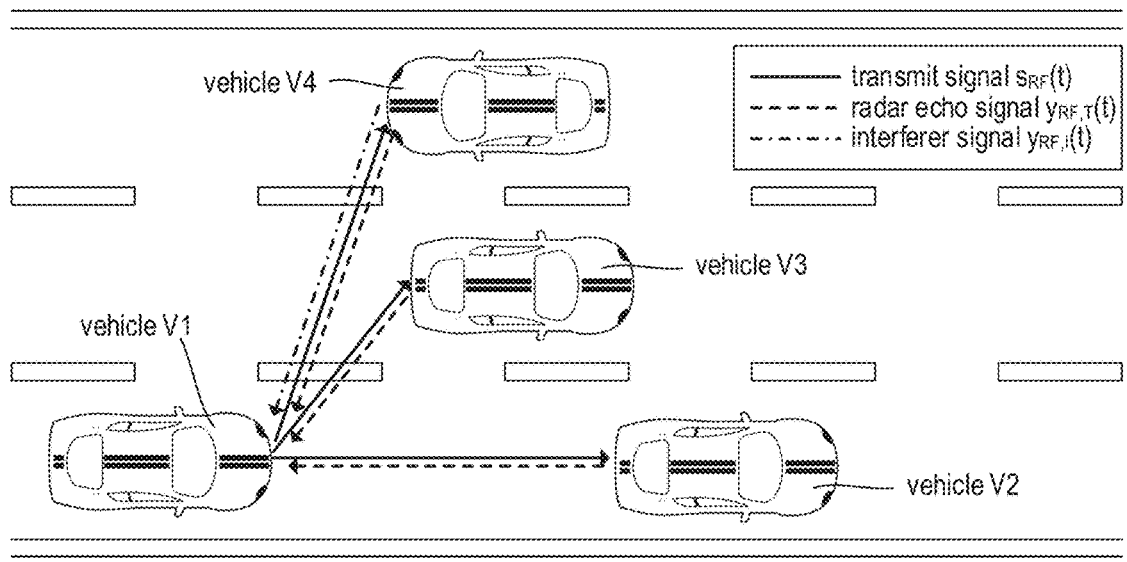
FIG. 7 illustrates one example of how interference is interspersed to the receiver of a radar sensor.

FIG. 7 illustrates one simple example showing how an interferer can disturb the received radar echoes. Accordingly, FIG. 7 illustrates a road with three lanes and four vehicles V1, V2, V3, and V4. At least vehicles V1 and V4 are equipped with a radar sensor. The radar sensor of vehicle V1 radiates an RF radar signal $s_{RF}(t)$ and the received signal $y_{RF}(t)$ includes the radar echoes back-scattered form the vehicles V2 and V3 driving ahead as well as from the vehicle V4 of the approaching traffic. Further, the signal $y_{RF}(t)$ received by the radar sensor of vehicle V1 includes a radar signal (interference signal) radiated by the radar sensor of approaching vehicle V4 (which is an interferer for the radar sensor of vehicle V1).

The signal $y_{RF}(t)$ received by the radar sensor of vehicle V1 may be written as $$y_{RF}(t) = y_{RF,T}(t) + y_{RF,I}(t), \text{ wherein} \quad (2)$$

$$y_{RF,T}(t) = \sum_{i=0}^{U-1} A_{T,i} \cdot s_{RF}(t - \Delta t_{T,i}) \text{ and} \quad (3)$$

$$y_{RF,I}(t) = \sum_{i=0}^{V-1} A_{I,i} \cdot s_{RF,i}'(t - \Delta t_{I,i}). \quad (4)$$

In the above equations (2) to (4) the signals $y_{RF,T}(t)$ and $y_{RF,I}(t)$ are the signal components of the received signal $y_{RF}(t)$ due to real radar targets and, respectively, due to interference. In practice, more than one radar echo and more than one interferer may be present. Equation (3) represents the sum of the radar echoes caused by U different radar targets, wherein $A_{T,i}$ is the attenuation of the radar signal and $t_{T,i}$ the round trip delay caused by the $i^{th}$ radar target. Similarly, eqn. (4) represents the sum of the interference signals caused by V interferers, wherein $A_{I,i}$ denotes the attenuation of the radiated interference signal $s_{RF,i}'(t)$ and $\Delta t_{I,i}$ the associated delay (for each interferer $i=0, 1, \ldots V-1$). It is noted that the radar signal $s_{RF}(t)$ radiated by the radar sensor of vehicle V1 and the interfering radar signal $s_{RF,0}'(t)$ (interference signal, index $i=0$) radiated, e.g. by the radar sensor of vehicle V4 generally will include different chirp sequences with different chirp parameters (start/stop frequencies, chirp durations, repetition rates, etc.). It is noted that the amplitude of the signal component $y_{RF,I}(t)$ due to interference is usually significantly higher than the amplitude of the signal component $y_{RF,T}(t)$ due to the radar echoes.

Figure 8:
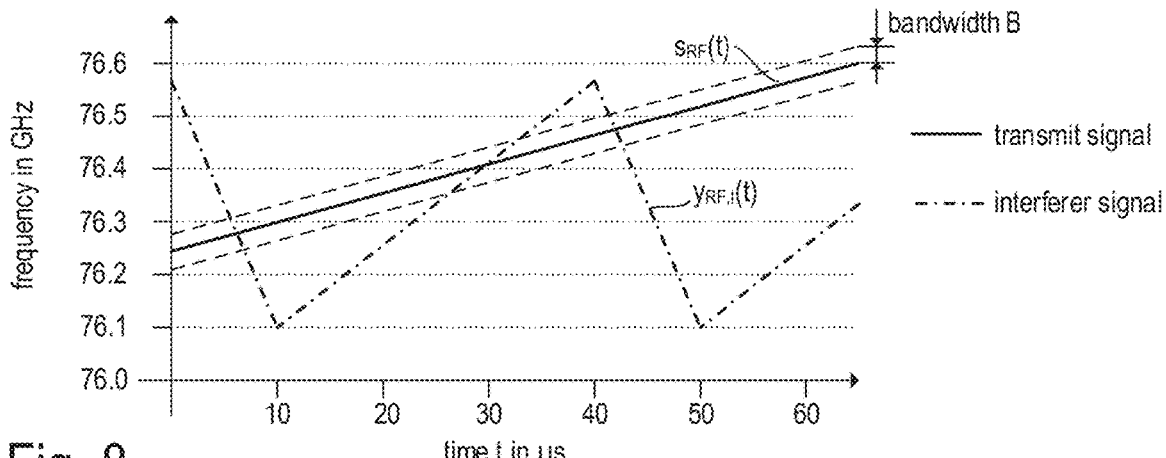
FIG. 8 illustrates in a timing diagram a transmit signal of a radar sensor and an interference signal from an interferer, wherein frequency-over-time waveform of these signals at least partially overlap.
Figure 9:
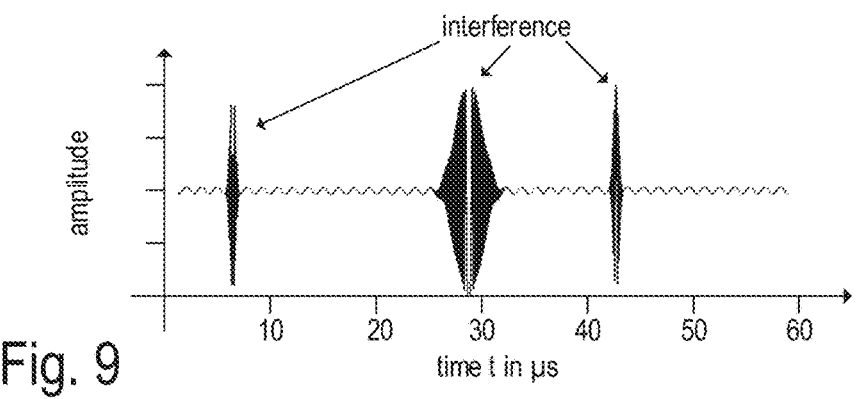
FIG. 9 illustrates one exemplary waveform including a radar signal (after down-conversion to the base band) including a radar echo from a target and interference shown in FIG. 8.

FIGS. 8 and 9 illustrate, by way of example, how an interferer may disturb the radar echoes included in the signal $y_{RF}(t)$ received by a radar sensor. FIG. 8 illustrates frequency over time of one chirp (chirp duration 60 µs) radiated by a radar sensor. The start frequency of the radiates signal $s_{RF}(t)$ is approximately 76250 MHz and the stop frequency is approximately 76600 MHz. An interference signal $y_{RF,I}(t)$ generated from another radar sensor includes an up-chirp starting at approximately 76100 MHz and stopping at 76580 MHz (chirp duration 30 µs) and a subsequent down-chirp starting at the stop frequency of the preceding up-chirp (76580 MHz) and stopping at the start frequency of the next up-chirp (76100 MHz) with a chirp duration of 10 µs. The bandwidth B of the base band signal of the radar sensor, which is substantially determined by the base-band signal processing chain 20 (particularly by filter 21 shown in FIG. 4), is indicated in FIG. 8 by the dashed lines. FIG. 9 illustrates an exemplary waveform of the (pre-processed) base band signal y(t) resulting from the interference signal $y_{RF,I}(t)$ down-converted to the base-band in the radar sensor. One can see that the signal components due to the interference have a significant magnitude in those time intervals in which the frequency of the interference signal is within the bandwidth B of the radar sensor (see FIG. 8). In the present example, the interference occurs three times during the 60 µs chirp duration, namely at approximately 7 µs, 28 µs and 42 µs. As mentioned, the power of interference signals is usually higher than the power of radar echoes from real targets. Further, interference signals and the transmit signal of a specific radar sensor are usually uncorrelated and thus the interference can be regarded as noise and increases the overall noise floor.

Figure 10:
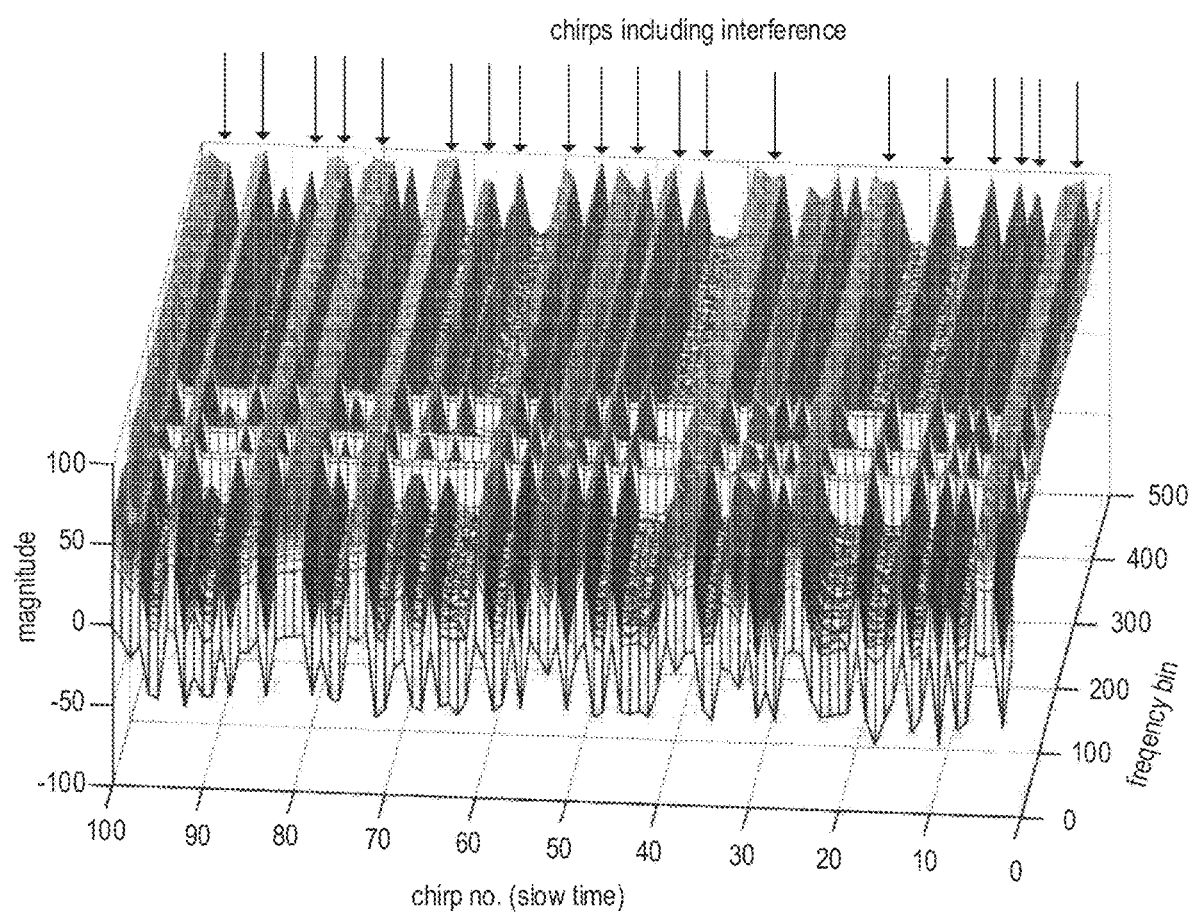
FIG. 10 is a 3D diagram illustrating a range map including echoes from three radar targets and interference.

FIG. 10 is an 3D illustration of an example of a (simulated) range map R[n, m] that includes interference and three radar targets. The three radar targets manifest as peaks around the frequency bins number $n_1=200$, $n_2=240$, and $n_3=300$ and are present in the echo signal of all chirps (the frequency corresponds to the distance of the target, see equation 1). However, in the echo signal of some chirps those peaks are superposed by interference, which may have significantly more power (e.g. magnitude in dB) than the peaks caused by the radar targets. For example, in the echo signals of chirps around chirp no. 40, the mentioned peaks caused by the radar targets are overcast by the interference and thus disappear.

Figure 11:
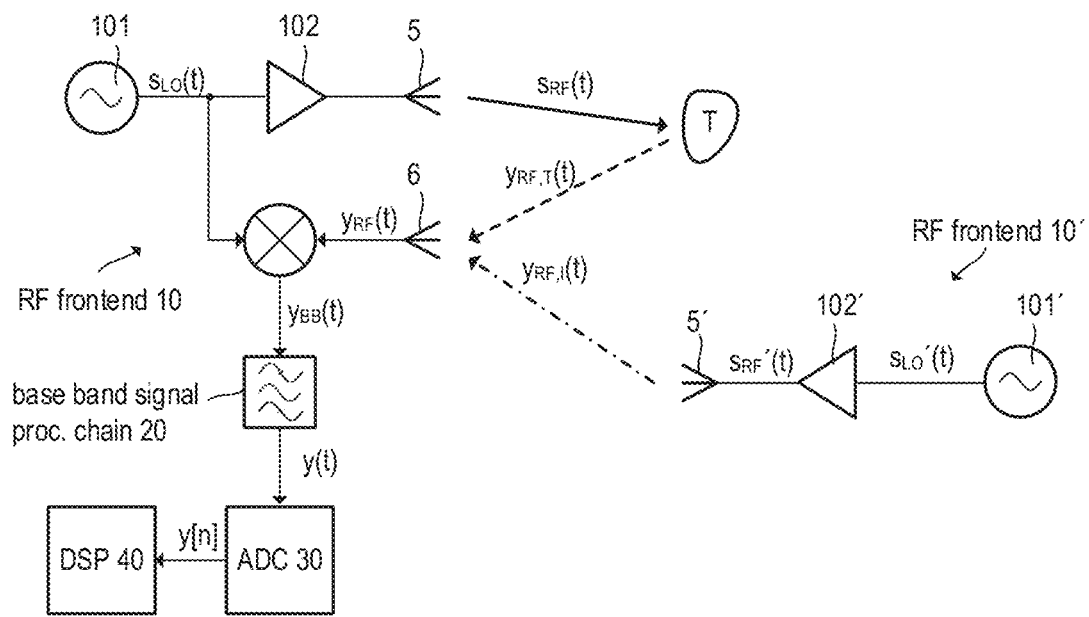
FIG. 11 is a circuit diagram illustrating one example of an analog RF frontend of a radar sensor and an analog RF frontend of an interferer.

FIG. 11 illustrates by means of block diagrams how an interference signal $y_{RF,I}(t)$ is down-converted to the base band and superposes on radar echoes $y_{RF,T}(t)$ from real radar targets (cf. eqn. (2) to (4)). FIG. 11 illustrates the RF frontend 10 of a radar sensor as described before with reference to FIG. 4. Local oscillator 101 is configured to generate an oscillator signal $s_{LO}(t)$ that includes sequences of chirps, which are amplified (amplifier 102) and radiated as transmit signal $s_{RF}(t)$ via TX antenna 5. The signal back-scattered at target T and received by RX antenna 6 is denoted as $y_{RF,T}(t)$ (cf. equation (3), number of targets U is 1). Additionally, FIG. 11 illustrates the RF frontend 10' of a further radar sensor, which includes an LO oscillator 101' for generating an oscillator signal $s_{LO}'(t)$. The oscillator signal $s_{LO}'(t)$ also includes sequences of chirps (different from signal $s_{LO}(t)$) that are amplified (amplifier 102') and radiated by TX antenna 6' as interference signal $s_{RF}'(t)$. The interference signal arriving at antenna 6 of the first radar sensor is denoted as $y_{RF,I}(t)$ (cf. equation (4), number of interferers V is 1).

Both, the radar echo $y_{RF,T}(t)$ and the interference signal $y_{RF,I}(t)$ are received by the antenna 6 and superpose at the RF input of mixer 104. It can be seen from FIG. 11 that the interference signal component $y_{RF,I}(t)$ of the received signal $y_{RF}(t)$ is down-converted into the base band in the same way as radar echoes $y_{RF,T}(t)$ included in the received signal $y_{RF}(t)$. Accordingly, when the frequency difference between the instantaneous frequency $f_{LO}$ of the transmit signal and the instantaneous frequency of the received interference signal $y_{RF,I}(t)$ lies within the bandwidth B of the base-band signal processing chain 20, the interference will also be present in the digital signal y[n]. The remaining options are either to discard the samples of the affected chirps or to (at least partially) suppress the remaining interference by employing digital signal processing techniques.

Two approaches that aim at cancelling interference in the digital domain are time domain thresholding (TDT) and frequency domain thresholding (FDT). Both methods adaptively calculate a threshold which is used to discriminate radar echoes from real targets from interference. However, finding a threshold that allows a reliable discrimination between radar echoes and interference may be difficult in real-world scenarios. Furthermore, when using FDT, if the threshold is exceeded, the affected chirp will be discarded and ignored during further processing. Approaches using TDT only discard the affected part of a chirp. Examples of the signal processing approach described below allow (at least partial) interference suppression without the need of a threshold to discriminate radar echoes from interference.

Figure 12:
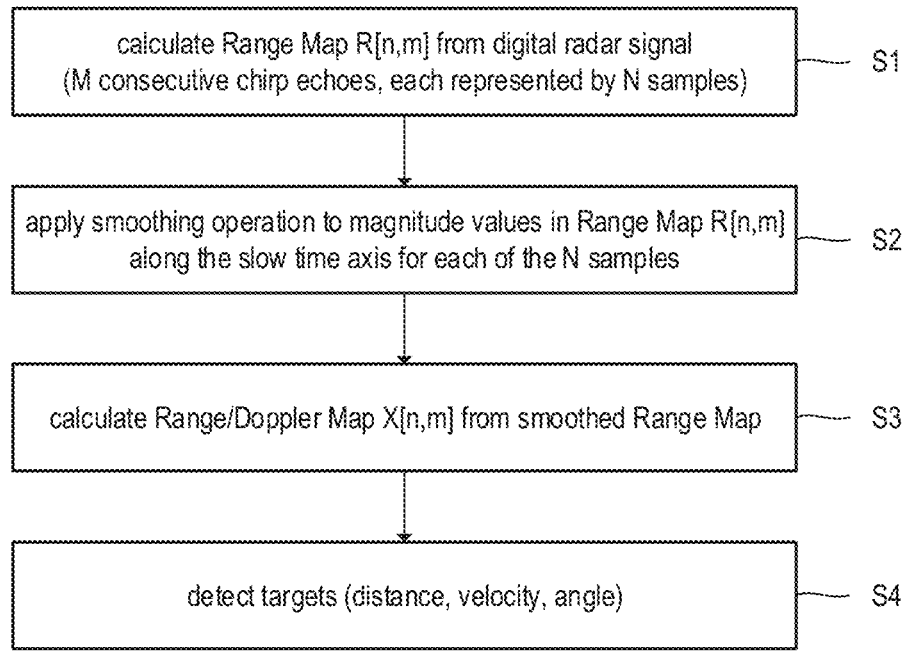
FIG. 12 is a flow chart illustrating one exemplary implementation of a method for suppressing/reducing interference in a digital radar signal.

FIG. 12 is a flow chart illustrating one exemplary method for suppressing or reducing interference in the digital domain, in particular based on a Range-Map R[n, m] obtained by sampling the digital (base band) radar signal y[n] (see FIGS. 4 and 10). In a first step S1 a range map R[n] is calculated from a digital radar signal y[n], which represents a sequence of a specific number of chirps. Without loss of generality, the number of chirps is denoted as M, and the sampling rate is chosen such that each chirp is represented by N samples. Accordingly, N×M samples of the digital radar signal y[n] are processed. As shown in FIG. 6, diagrams (b) and (c), these samples can be arranged in an N×M matrix herein denoted as Y[n, m]. The range map R[n, m] may be obtained by applying an FFT to each of the M columns. The line index n of the range map R[n, m] represents the discrete frequency values (frequency bins) and the column index m represents the chirp number (or time values on the slow time axis).

As explained above with reference to FIG. 6, the M columns of the range map R[n, m] include the spectra of M segments of the digital radar signal y[n] representing the radar echoes caused by the chirps included in the transmitted RF signal $s_{RF}(t)$. That is, the matrix elements of the range map R[n, m] are complex-valued spectral values $\tilde{A}_{n,m}$ wherein each spectral value $\tilde{A}_{n,m}$ is associated with a specific frequency bin and a specific chirp number (or time value on the slow time axis). The complex values $\tilde{A}_{n,m}$ can be expressed as $$\tilde{A}_{n,m} = A_{n,m} \cdot e^{j \varphi_{n,m}} \text{ for } n=[0, \ldots, N-1] \text{ and } m=[0, \ldots, M-1], \quad (5)$$

wherein $A_{n,m}$ represents the magnitude, $\varphi_{n,m}$ represents the respective phase of the spectral value $\tilde{A}_{n,m}$, and j denotes the imaginary unit. As mentioned, n denotes a frequency bin and m the chirp number (equivalent to a time value $m \cdot T_{CHIRP}$ on the slow time axis). According to a more general approach, each complex-valued spectral value $\tilde{A}_{n,m}$ is represented by at least a first parameter, which may be the magnitude, the phase, the real part or the imaginary party or any other parameter (e.g. the exponential function $e^{j\varphi_{n,m}}$) suitable to represent a complex value.

Again referring to the flow chart of FIG. 12, a smoothing operation is applied on the sequence of first parameters (e.g. magnitudes $(A_{n,0}, A_{n,1}, \ldots, A_{n,m}, \ldots, A_{n,M-1})$) for at least one, for some or for all frequency bins n of the range map (FIG. 12, step S2, n=0, . . . , N−1). In other words, the smoothing operation is applied to at least one line (or, line by line, to each line) of the range map R[n, m], wherein the smoothing operation may be a non-linear operation and only affects the magnitude values but leaves the phase values $\varphi_{n,m}$ unchanged in case the first parameters are the magnitudes and the second parameters are the phases. In step S3 the Range Doppler/Map X[n, m] may be calculated from the smoothed range map in a conventional manner (see FIG. 6), and target detection (distance, velocity) may be done based on the Range Doppler/Map X[n, m] using any known algorithm (step S4). As mentioned, each frequency bin n corresponds to a specific range/distance value. In the following examples, the first parameters are the magnitudes of the spectral values in the range map and the phase may be regarded as second parameters. It is noted, however, that the present disclosure is not limited to the smoothing of magnitudes.

Figures 13, 14:
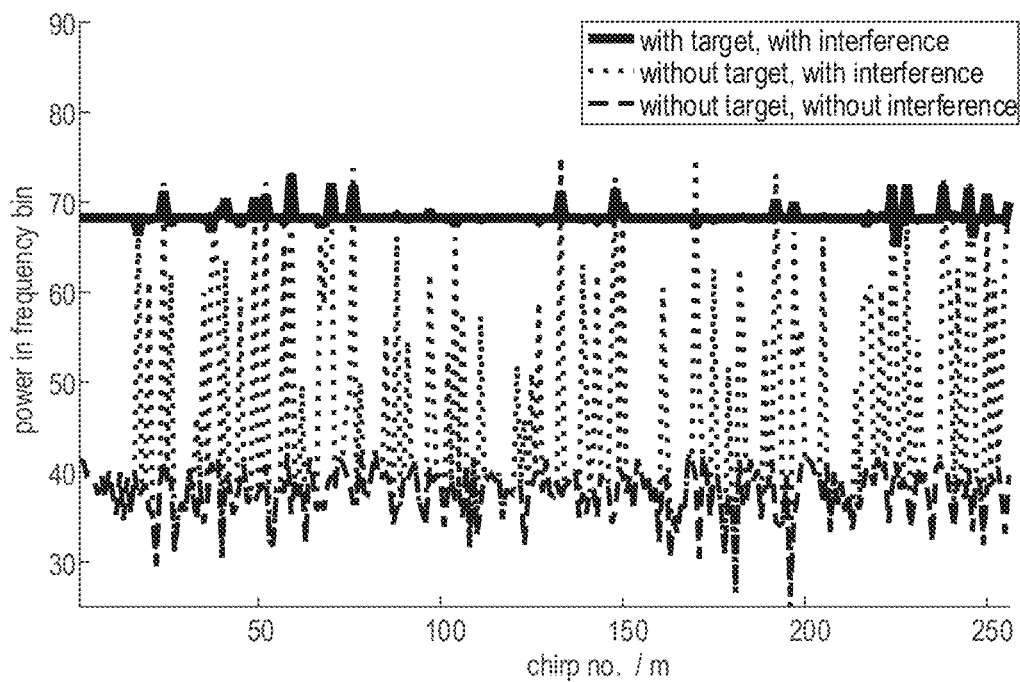
FIG. 13 illustrates the structure of a range map.
FIG. 14 illustrates one exemplary waveform showing the signal power over time for frequency bins including noise only, noise and a radar echo, and noise and interference.

In the following, the smoothing operation is discussed in more detail. FIG. 13 illustrates a range map R[n, m], whose lines include the input data for the smoothing operation. It is noted that only the magnitudes $A_{n,m}$ are shown in the FIG. 13 in order to keep the illustration simple. Before discussing the smoothing operation in more detail, the magnitude values $A_{n,m}$ in the range map R[n, m] are analyzed for a specific example, which has been obtained by simulation. The waveforms shown in FIG. 14 represent the magnitude values $A_{n1,m}$, $A_{n2,m}$, and $A_{n2,m}$ for three different frequency bins $n_1$, $n_2$, and $n_3$, respectively (i.e. three different lines of R[n, m]). In the present example the number of chirps M is 256 (m=0, . . . , 255).

In FIG. 14, the dashed line represents the sequence $R[n_3, m] = (A_{n3,0}, A_{n3,1}, \ldots, A_{n3,255})$ associated with frequency bin $n_3$. The magnitudes (corresponding to the signal power) in this frequency bin $n_3$ basically include only noise but no radar echo and no interference. Thus, the sequence $R[n_3, m]$ basically represents the noise floor (i.e. is one realization of the noise-only signal). The solid line represents the sequence $R[n_1, m] = (A_{n1,0}, A_{n1,1}, \ldots, A_{n1,255})$ associated with frequency bin $n_1$; the magnitudes in this frequency bin $n_1$ basically include noise and a radar echo from a real radar target. The distance $d_T$ of the target can be determined in accordance with equation (1), wherein the beat frequency $\Delta f$ is given by the frequency bin $n_1$. As can be seen in FIG. 14, the signal magnitude (power) caused by a radar target is significantly above the noise floor and approximately the same for all 255 chirps. That is, the sequence $R[n_1, m]$ is basically a flat horizontal line with only small fluctuations due to noise and interference. The dotted line represents the sequence $R[n_2, m] = (A_{n2,0}, A_{n2,1}, \ldots, A_{n2,255})$ associated with frequency bin $n_2$; the magnitudes in this frequency bin $n_2$ basically include noise and interferences but no radar echo. As can be seen in FIG. 14, the signal magnitude (power) caused by interference may be significantly above the noise floor but usually will vary greatly over the 255 chirps. For some chirps (e.g. m≈0 to 9, or m≈120, m≈150 to 160, etc.), the signal power may be close to the noise floor, whereas for other chirps the signal power may be similar to the signal power of a radar echo or even higher.

To summarize the above, the three curves in the diagram of FIG. 14 visualize a "section" through the columns of a range map at specific discrete frequency values (frequency bins); these sections show signal magnitude/power in the respective frequency bin over the slow time axis (chirp number). A radar echo will manifest itself as a (local) peak that does not significantly vary along the slow time axis when considering a realistic automotive application scenario. That is, substantially the same peak power will appear in all chirps at the relevant frequency bin. Differently, an interference signal will also manifest itself as a peak; however, this peak varies greatly along the slow time axis. That is, the signal power due to interference will usually not evenly appear in all chirps at the relevant frequency bin. However, this may highly depend on the number of potential interferers.

FIG. 15 illustrates two examples of how interference can be suppressed or at least reduced by applying the above-mentioned smoothing operation to the lines of a range map R[n, m]. According to diagram (a) of FIG. 15 a smoothing operation is—for each frequency bin—applied to the magnitudes of the spectral values along the slow time axis. In other words, for each frequency bin the magnitudes of the spectral values associated with the M consecutive chirps are smoothed to reduce the strong fluctuations due to interference (see FIG. 14, dashed curve). The smoothing operation may be a non-linear operation, which is configured to reduce strong fluctuations along the slow time axis (due to interference) but does not significantly affect radar echoes from real targets as these usually cause a local signal maximum that is substantially constant along the slow time axis (see FIG. 14, solid curve).

Accordingly, the smoothing operation can be written as a function $$\text{smooth: } \mathbb{R}^M \to \mathbb{R}^M, (A_{n,0}, A_{n,1}, \ldots, A_{n,M-1}) \to (A'_{n,0}, A'_{n,1}, \ldots, A'_{n,M-1}), \quad (6)$$

which maps the magnitude values $(A_{n,0}, A_{n,1}, \ldots, A_{n,M-1})$ at a specific frequency bin n to the smoothed magnitude values $(A'_{n,0}, A'_{n,1}, \ldots, A'_{n,M-1})$. In one simple example, the smoothing operation may be the minimum operation min(•). In this case the smoothing operation can be written as:

$$\text{smooth: } \mathbb{R}^M \to \mathbb{R}^M, (A_{n,0}, A_{n,1}, \ldots, A_{n,M-1}) \to (A_{n,min}, A_{n,min}, \ldots, A_{n,min}), \quad (7)$$

wherein $A_{n,min} = \text{Min}(A_{n,0}, A_{n,1}, \ldots, A_{n,M-1})$. In other words, at each frequency bin n=0, 1, . . . N−1, the magnitudes are replaced by the minimum $A_{n,min}$. This example is illustrated in diagram (b) of FIG. 15.

It is understood that, although the minimum operation yields good results when applied to simulated data (simulated range map including simulated radar echo and interference), other smoothing operations may yield better results when applied to measured data from real radar targets and interferers. Other suitable smoothing operations may be, inter alia, averaging, moving average filter, median filter, minimum operation in a sliding window (moving minimum) or the like. Two or more smoothing operations may be combined to obtain further suitable smoothing operations. In case of a median filter the values $A'_{n,m}$ in equation (6) can be calculated as, $$A'_{n,m} = \text{median}(A_{n,m-w}, A_{n,m-w+1}, \ldots, A_{n,m-1}, A_{n,m}, A_{n,m+1}, \ldots, A_{n,m+w}), \quad (8)$$

wherein 2w+1 is the window size of the median filter, and wherein indices lower than 0 and greater than M−1 are replaced by 0 and M−1, respectively. With an exemplary window size of 7 (w=3), equation (8) yields $$A'_{n,m} = \text{median}(A_{n,m-3}, A_{n,m-2}, A_{n,m-1}, A_{n,m}, A_{n,m+1}, A_{n,m+2}, A_{n,m+3}). \quad (9)$$

As mentioned, the smoothing operation does not affect the phase values $\varphi_{n,m}$. Accordingly, the smoothed range map R'[n, m] is composed of the smoothed magnitude values $A'_{n,m}$ and the original phase values $\varphi_{n,m}$. That is $$R'[n,m] = A'_{n,m} \cdot e^{j\varphi_{n,m}} \text{ for } n=1, \ldots, N-1 \text{ and } m=1, \ldots, M-1 \quad (10)$$

The smoothed range map R'[n, m] can be further processed in any conventional manner, e.g. by applying the second stage of FFTs to the lines of the range map R'[n, m] in order to obtain the Range-Doppler Map X[n,m], which allows, inter alia, detection of target velocities. Target detection and classification may be done based on the Range-Doppler Map X[n,m] using conventional algorithms.

As mentioned above, the smoothing operation is applied line by line to the range map along the slow time axis (or column by column if a transposed representation is used), i.e. the smoothing operation is applied to the magnitudes of the spectral values in a specific frequency bin for each chirp. Accordingly, the magnitudes of the spectral values in a specific frequency bin can be regarded as a time-discrete signal and a least some of the mentioned smoothing operations can be regarded as mathematical operations such as time-discrete filters (e.g. median filter).

According to the examples described herein, only the magnitudes $A_{n,m}$ in the range map R[n,m] are smoothed, whereas the phase terms $e^{j\varphi_{n,m}}$ are left unchanged. This allows to proceed with Range/Doppler processing to determine the velocities of the detected targets. Interference, however, does not only affect the magnitudes but also the phase values. For a comparably low interference signal power (e.g. when the interference power does not significantly exceed the power of the radar echoes) the deterioration of the phase term $e^{j\varphi_{n,m}}$ due to interference may lead to a negligible measurement error in the target velocities. However, for higher interference signal power (e.g. when the interference power t significantly exceeds the power of the radar echoes) the deterioration of the phase term $e^{j\varphi_{n,m}}$ due to interference may lead to a significant corruption of the velocity measurement.

This situation is illustrated in FIG. 16. Diagrams (a) and (b) of FIG. 16 illustrate the superposition of the complex-valued radar echo and interference signals as well as the effect of interference suppression according to the examples described herein. In the case shown in diagram (a) the interference only slightly deteriorates the phase of the radar echo signal from the target, which leads to a small phase error between the undistorted radar echo signal and the radar echo signal after interference suppression. In the case shown in diagram (b) the interference significantly deteriorates the phase of the radar echo signal from the target, thus leading to a large phase error. The concept of smoothing the magnitudes $A_{n,m}$ in the range map R[n,m] as presented above does not exclude an additional manipulation/correction of the phase terms $e^{j\varphi_{n,m}}$. One example of a method for correcting (restoring) the phase terms will be described below; this method may be used in connection with the interference suppression described above.

Before explaining the phase restoration concept in more detail, it is noted that restoration of phase information is only useful in those portions of a range map (cf. FIG. 6, range map R[n, m]), in which a radar echo of a real radar target appears. If—as shown in the range map of FIG. 10—three radar targets have been identified (e.g. after interference suppression), then the phase information needs only be restored in the corresponding three frequency bins in which the radar target causes sufficient signal power. Accordingly, the phase restoration method starts with a selection of frequency bins. For the further discussion, it is assumed that the radar echo of the three targets appears in frequency bins $n_1$, $n_2$ and $n_3$, and, consequently, only the lines $R[n_1, m]$, $R[n_2, m]$, and $R[n_3, m]$ will be considered for the phase restoration (m=0, . . . , M−1, cf. FIG. 6).

Figure 17:
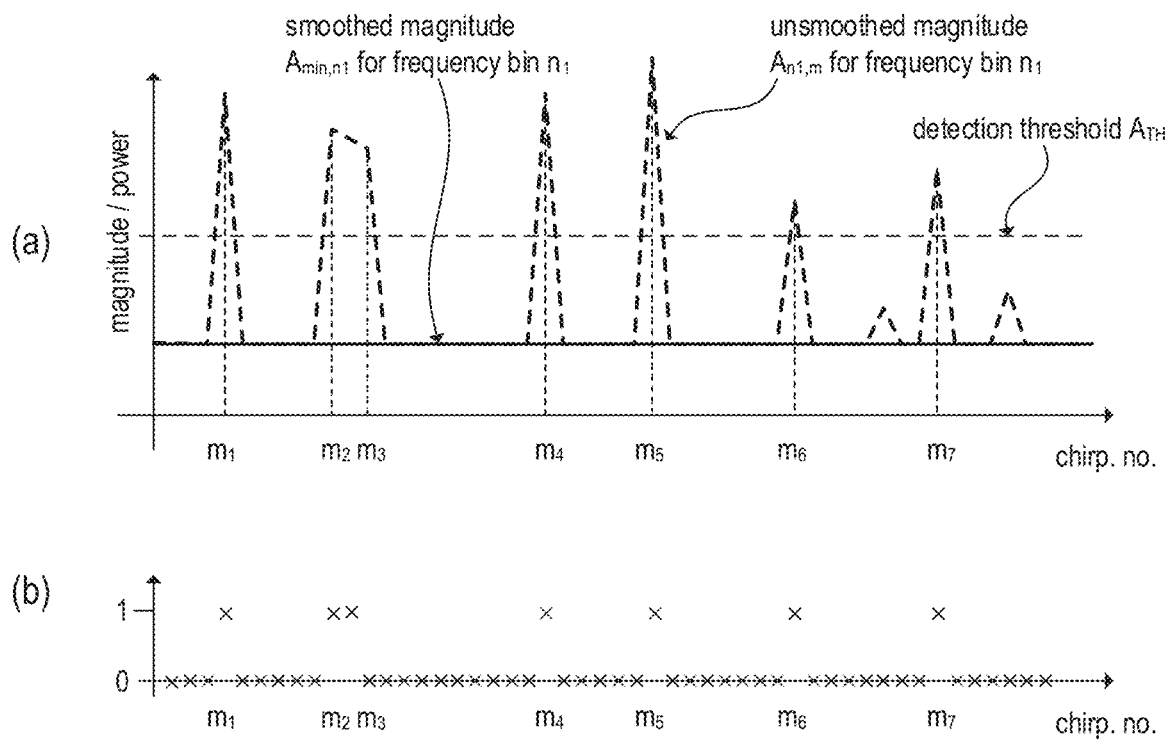
FIG. 17 illustrates the identification of interference-affected chirp echoes using the magnitude values in a range map for a specific frequency; diagram (a) illustrates the signal power over time and diagram (b) the affected chirp echoes.

Diagram (a) of FIG. 17 illustrates the signal power (or signal amplitudes) along the slow time axis for one of the selected frequency bins, in the present example for frequency bin $n_1$. The solid line illustrates the smoothed amplitudes $A_{n1,min}$, and is constant along the slow time axis if the smoothing operation is the minimum operation. The bold dashed line represents the unsmoothed amplitudes $A_{n1,m}$ amplitudes which are affected by interference. In order to identify the chirp echoes that are affected by interference, the amplitudes $(A_{n1,0}, A_{n1,1}, \ldots, A_{n1,M-1})$ may be compared with a threshold level $A_{TH}$, and those indices m (number of chirp echo) for which the amplitudes $A_{n1,m}$ exceeds the threshold level $A_{TH}$ are marked as "intererence affected". In the depicted example, the chirp echoes with the indices $m_1$, $m_2$, $m_3$, $m_4$ $m_5$, and $m_6$ are affected by interference. The mentioned marking may be accomplished, for example, by generating a 1×M vector V which includes a "1" for index positions $m_1$, $m_2$, $m_3$, $m_4$ $m_5$, and $m_6$ (indicating the affected chirp echoes) and a "0" for all remaining index position. In other words, the vectors V is defined as $$V = v_m = \begin{cases} 1 & \text{if } A_{n1,m} \geq A_{TH} \\ 0 & \text{if } A_{n1,m} < A_{TH} \end{cases}. \quad (11)$$

Basically, the vector V may be regarded as a list of the indices of those chirp echoes that are affected by interference. In fact, a simple list or any other kind of marking may be used instead of generating the vector V. Diagram (b) of FIG. 17 illustrates the vector V for frequency bin $n_1$, wherein the vector V includes a "1" at those indices m, for which the condition $A_{n1,m} \geq A_{TH}$ holds true (see equation 11) and a "0" otherwise.

In the present example, a simple threshold technique is used to distinguish interference affected chirp echoes from unaffected chirp echoes. It is understood that other, more complex criteria may be used to identify the chirp echoes that include interference. For example, a statistical parameter such as the variance or the standard deviation may be calculated for the amplitude values along the frequency axis of the range map R[n, m]. Accordingly, the vector may alternatively be generated as follows:

$$V = v_m = \begin{cases} 1 & \text{if } \text{var}\{A_{0,m}, A_{1,m}, \ldots, A_{N-1,m}\} \geq \sigma_{TH}^2 \\ 0 & \text{if } \text{var}\{A_{0,m}, A_{1,m}, \ldots, A_{N-1,m}\} < \sigma_{TH}^2 \end{cases} \quad (12)$$

wherein $\sigma_{TH}^2$ is a variance threshold. When using the approach of equation 11, the threshold level $A_{TH}$ may be set dependent, e.g. on the amplitude peak $A'_{n1,0}$ in frequency bin $n_1$ of the smoothed range map $R'[n,m]$. When using the minimum operation for smoothing (see equation 7) the minimum amplitude vale $A_{n1,min}$ may be used instead of $A'_{n1,0}$. Alternatively, the threshold level $A_{TH}$ may be set dependent on the average amplitude in the considered frequency bin $n_1$ of the smoothed range map $R'[n,m]$. For example, the threshold level $A_{TH}$ may be proportional to $A_{n1,min}$, i.e.

$$A_{TH} = \alpha \cdot A_{n1,min}, \quad (13)$$

wherein α may be chosen between, for example, 1.2 and 2.0. In other words, the threshold level for detecting interference in frequency bin $n_1$ may be set in the range between 120 and 200 percent of the peak amplitude $A_{n1,min}$, which is caused by a radar echo of a real radar target. When using the approach of equation 12, the amplitudes $A_{n1,m}$, $A_{n2,m}$ and $A_{n2,m}$ in frequency bins $n_1$, $n_2$, and $n_3$ may be omitted for the calculation of the variance, so that the calculated variances are not influenced by the peak amplitudes caused by radar echoes of real radar targets.

Once the indices of the chirp echoes that are affected by interference have been identified (in the example of FIG. 17, chirp numbers $m_1$, $m_2$, $m_3$, $m_4$, $m_5$, $m_6$, and $m_7$), the phase information can be processed for the selected frequency bins (e.g. bins $n_1$, $n_2$ and $n_3$), wherein the phase values from the interference affected chirp echoes are disregarded and thus not used for the phase restoration. In other words, the phase restoration is done based on the phase values from only those chirp echoes not affected by interference. Several approaches may be suitable for restoring the phase information, wherein all approaches try to replace the distorted phase terms $e^{j\cdot\varphi_{n,m}}$ included in those columns of the measured range map R[n,m] that are associated with the interference affected chirp numbers by estimations (e.g. approximations) of the undistorted phase; these estimations/approximations may be calculated based on the undistorted phase values $e^{j\cdot\varphi_{n,m}}$ taken from those columns of the measured range map R[n,m] that are not associated with interference affected chirp numbers. As mentioned, phase restoration is only useful for the selected frequency bins, i.e. only those that include a local maximum indicative of a real radar target.

Figure 18:
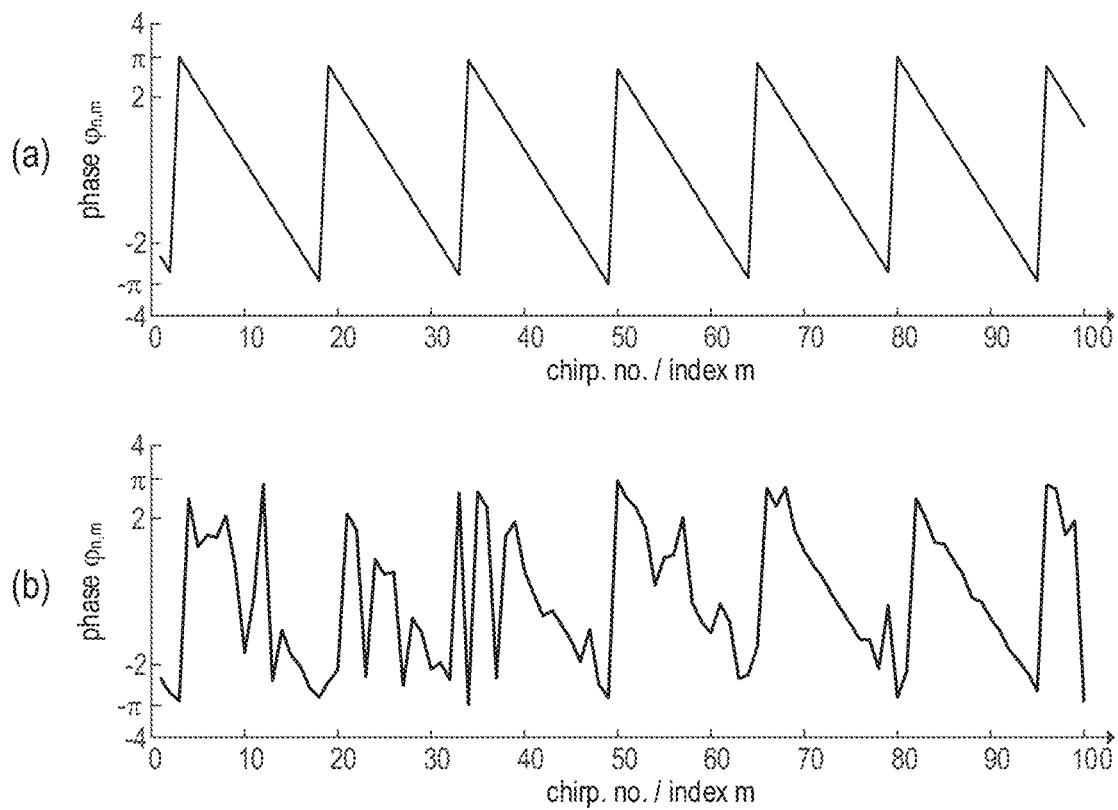
FIG. 18 includes example waveforms illustrating the phase along the slow time axis for the case that a radar echo of a moving target is present; diagram (a) illustrates an ideal case and diagram (b) includes distorted phase values due to interference.

FIG. 18 illustrates two example waveforms of phase along the slow time axis for a specific frequency bin $n_1$, which corresponds to a moving radar target. Diagram (a) of FIG. 18 illustrates an ideal case of an undistorted phase. The velocity of the target is assumed to be substantially constant during the data acquisition for one range map, and thus the phase is linear. That is, $$\varphi_{n1,m+1} - \varphi_{n1,m} = \Delta\varphi_{n1} = \text{constant (for each } m, m=0,1,\ldots M-1). \quad (14)$$

In other words, the slope $\Delta\varphi_{n1}$ of the phase in frequency bin $n_1$ is constant and proportional to the velocity of the radar target. It is noted that the saw-tooth shape of the waveform in diagram (a) of FIG. 18 is only caused by phase transitions from $-\pi$ to $\pi$ (i.e. from $-180°$ to $180°$). However, this is only a matter of how the phase is illustrated in the diagram. In fact, the phase may also be represented by a straight line which has a slope of $\Delta\varphi_{n1}$ and runs from approximately 4 down to below $-11\pi$ after the phase is unwrapped. Diagram (b) of FIG. 18 illustrates one example in which the phase is distorted by noise and particularly by interference. It can be seen that for some chirp numbers in the waveform deviates significantly from the ideal form of diagram (a) of FIG. 18.

As mentioned, restoration of distorted phase values is basically based on replacing the distorted phase value by approximations of the "real" (undistorted) phase value, wherein the estimation (e.g. approximation) is obtained from the phase values not affected by interference. According to one exemplary approach, the ideal linear phase as shown in diagram (a) of FIG. 18 may be restored for a specific frequency bin $n_1$ using linear regression. According to this example, a linear regression line is calculated from only the undistorted phase values (i.e. disregarding the distorted phase values from interference affected chirp echoes) included in the respective frequency bin $n_1$. This process may be repeated for each of the selected frequency bins $n_1$, $n_2$, and $n_3$ (i.e. for each detected target).

According to another exemplary approach, one or more neighboring distorted phase value may be approximated by interpolating phase values. For example, the consecutive phase values $\varphi_{n1,m2}$ and $\varphi_{n1,m3}$ from the interference affected chirp echoes with indices $m_2$ and $m_3=m_2+1$ (see FIG. 17) may be interpolated as:

$$\varphi_{n1,m2} = \frac{2\varphi_{n1,m2-1} + \varphi_{n1,m3+1}}{3}, \text{ and} \quad (15)$$

$$\varphi_{n1,m3} = \frac{\varphi_{n1,m2-1} + 2\varphi_{n1,m3+1}}{3}. \quad (16)$$

Similarly, the phase value co T $n_{1,m4}$ from the interference affected chirp echo with index $m_4$ (see FIG. 17) may be interpolated as:

$$\varphi_{n1,m4} = \frac{\varphi_{n1,m4-1} + \varphi_{n1,m4+1}}{2}. \quad (17)$$

Interpolation may be done for each distorted phase value in each one of the selected frequency bins (e.g. frequency bin $n_1$ in the present examples).

According to a further approach, the measured phase values $\varphi_{n1,0}, \varphi_{n1,1}, \ldots, \varphi_{n1,M-1}$ are numerically differentiated to obtain the phase differences $\Delta\varphi_{n1,m}$ between two subsequent chirps, that is:

$$\Delta\varphi_{n1,m} = \varphi_{n1,m+1} - \varphi_{n1,m} \text{ for } m=0,1,\ldots,M-2 \quad (18)$$

These phase differences may be averaged to obtain an average phase difference $\overline{\Delta\varphi_{n1}}$ for the respective frequency bin $n_1$, wherein those phase differences that are based on distorted phase values are disregarded for the purpose of averaging. Assuming that phase values with the indices $m_1$, $m_2$, $m_3$, $m_4$ $m_5$, $m_6$, and $m_7$ are distorted, then the phase differences $\Delta\varphi_{n1,m}$ with indices $(m_1-1)$, $m_1$, $(m_2-1)$, $m_2$, $(m_3-1)$, $m_3$, etc. are not used to calculate the average phase difference $\overline{\Delta\varphi_{n1}}$. Assuming the first phase value $\varphi_{n1,0}$ for frequency bin $n_1$ is not distorted as a result of interference, the phase values may be restored by calculating (restored phase values being denoted as $\varphi_{n1,m}'$)

$$\varphi'_{n1,m} = \begin{cases} \varphi_{n1,0} & \text{for } m = 0 \\ \varphi_{n1,0} + m \cdot \overline{\Delta \varphi_{n1}} & \text{for } m = 1, 2, \ldots M-1 \end{cases} \quad (19)$$

It is noted that, in applications with a single receive antenna (e.g. when no DoA is to be determined), the initial phase $\varphi_{n1,0}$ may be set to zero as only the change (gradient) of the phase may be needed for further evaluation of the range map or the range doppler map derived therefrom (e.g. for calculation of the velocity of a radar target). In such applications, equation 19 may be simplified to $$\varphi_{n1,m}' = m \cdot \overline{\Delta \varphi_{n1}} \text{ for } m=0,2,\ldots M-1. \quad (20)$$

It is noted, however, that in some applications, the initial phase $\varphi_{n1,0}$ may not be set to zero as the value may be needed in the further processing (e.g. when determining the DoA of a radar target using signals from multiple antennas). It is further noted that the calculated and averaged phase differences (see equation 18) are not necessarily phase differences between two consecutive chirps. Alternatively, the phase differences $\Delta \varphi_{n1,m} = \varphi_{n1,m+2} - \varphi_{n1,m}$ (for m=1, 2, ... M−2) between two or more subsequent chirps (with indices m and m+2) may be considered.

Figure 19:
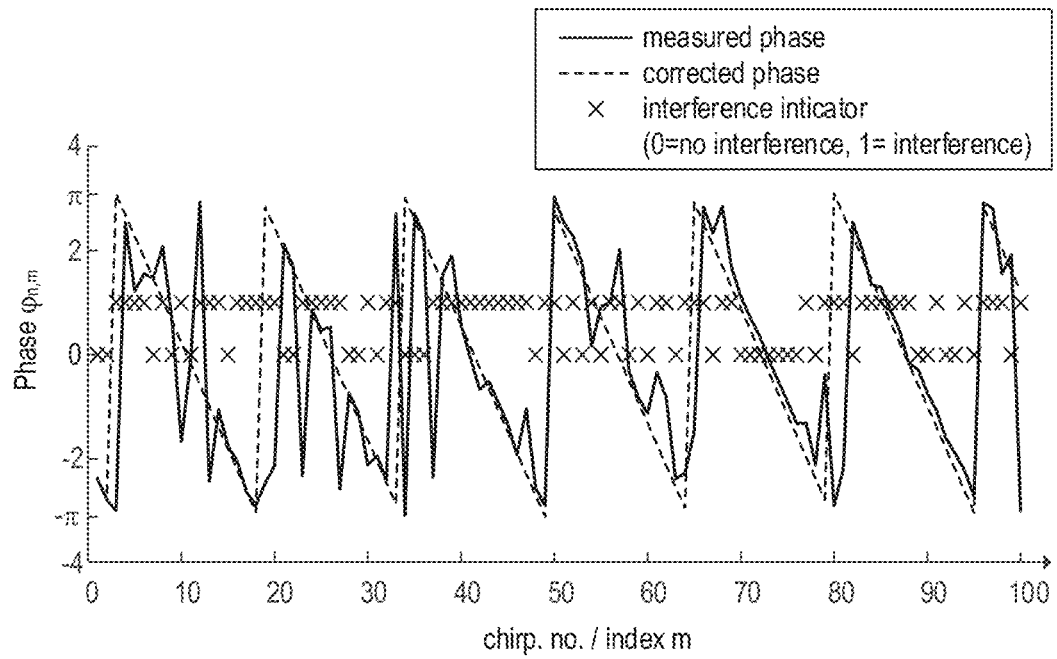
FIG. 19 illustrates the correction/restoration of the phase information in a specific frequency bin of a range map.

FIG. 19 provides an overview of the herein described examples for the correction/restoration of phase values that are distorted due to interference. The solid line represents the original waveform illustrating the phase along the slow time axis for a selected frequency bin. The phase values identified as distorted (i.e. the phase values resulting from a chirp echo signal that has been identified as interference affected) are marked in the same manner as in diagram (b) of FIG. 17. The corrected/restored (linear) phase is represented by the dashed line, wherein the approach according to equation 19 has been used to correct the phase.

Irrespective of which approach is used for phase restoration, the restored/corrected phase values $\varphi_{n1,m}'$ may be used in the smoothed range map R'[n,m] instead of the original phase values $\varphi_{n1,m}'$ (cf. equation 10), i.e.

$$R'[n,m] = A'_{n,m} \cdot e^{j \cdot \varphi_{n,m}'} \text{ for } n \in \{n_1, n_2, n_3\} \text{ and } m = 1, \ldots, M-1, \text{ and} \quad (21a)$$

$$R'[n,m] = A'_{n,m} \cdot e^{j \cdot \varphi_{n,m}} \text{ for } n \notin \{n_1, n_2, n_3\} \text{ and } m = 1, \ldots M-1. \quad (21b)$$

In other words the smoothed amplitude values $A'_{n,m}$ and the restored/corrected phase values $\varphi_{n,m}'$ are used to compile the smoothed range map R'[n, m] for selected frequency bins (e.g. frequency bins $n_1$, $n_2$, and $n_3$), which correspond to detected radar targets. In the remaining frequency bins, the original phase values $\varphi_{n,m}$ may be used. The smoothed range map R'[n, m] according to equation 21 may be the basis for further Range Doppler processing of the digital radar data.

Figure 20:
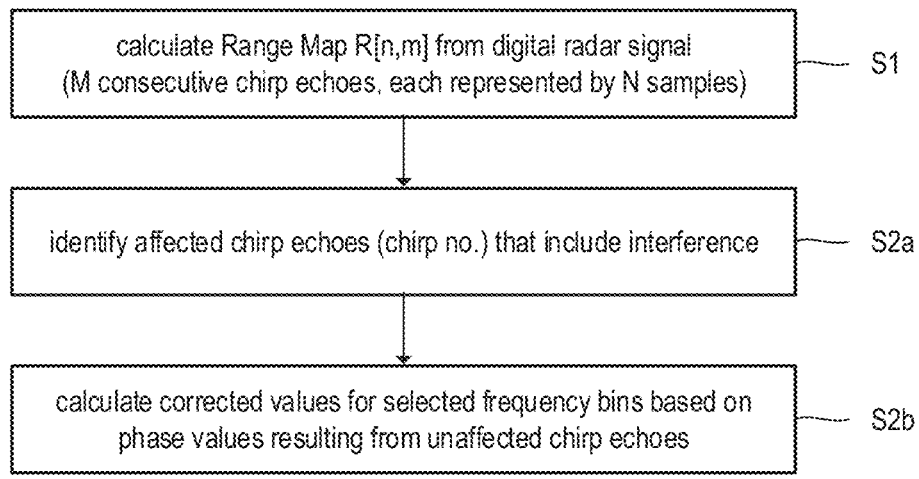
FIG. 20 is a flow chart representing one exemplary method for correction/restoration of phase information in a range map.

FIG. 20 is a flow chart summarizing the herein described approaches for correcting/restoring the phase. First, a range map R[n, m] is calculated from a digital radar signal, e.g. as illustrated in FIG. 6. This step S1 is identical to the first step in FIG. 12. Subsequently, the index numbers (index m) of the interference affected chirp echoes are identified (FIG. 20, step S2a). This may be done by marking the affected indices in a vector V as shown in equations 11 and 12. Then corrected phase values $\varphi_{n1,m}'$ are calculated for selected frequency bins based on undistorted phase values resulting from chirp echoes not affected by interference (FIG. 20, step S2b). This calculation of corrected phase values $\varphi_{n1,m}'$ may include linear regression or interpolation or averaging of phase differences as discussed in detail above. Dependent on the actual implementation, combinations of the described approaches may be used.

Figure 21:
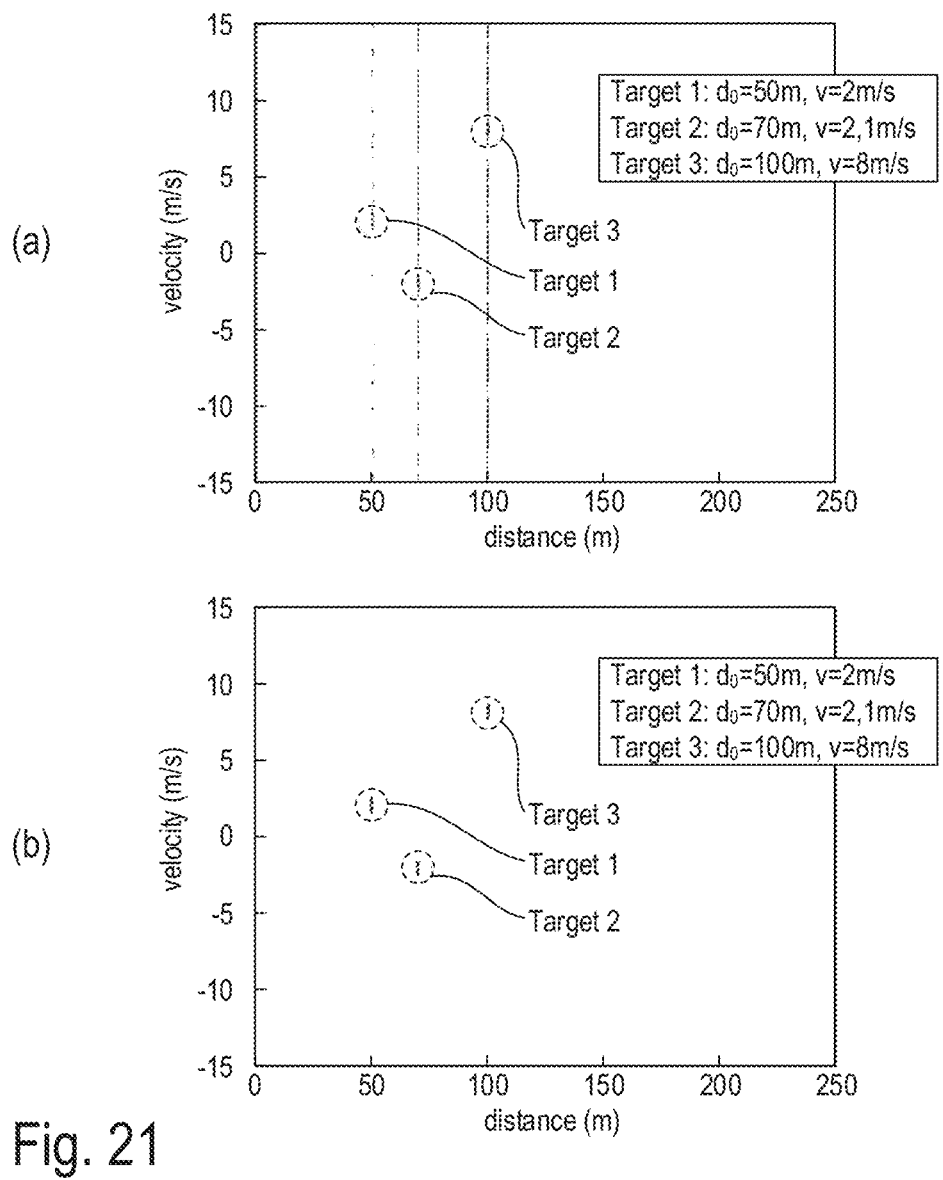
FIG. 21 includes two range doppler maps, wherein diagram (a) is the range doppler map calculated from a range map without phase correction and diagram (b) is the range doppler map calculated from the same range map with preceding phase correction.

FIG. 21 illustrates the effect of the phase restoration in the range doppler map. Diagram (a) of FIG. 20 is a range doppler map calculated from a smoothed range map without phase correction, whereas diagram (a) of FIG. 20 is a corresponding range doppler map calculated from a smoothed range map with phase correction. One can see that without phase correction artifacts may appear in the range doppler map which may impede the correct measurement of the velocities of the radar targets. In contrast, these artifacts disappear in the range doppler map when using the phase restoration as described herein. It is noted that it is not necessary to calculate the complete range doppler map to determine the velocities of the radar targets. For example, the velocity of the first radar target (associated with frequency bin $n_1$) can be directly calculated from the average phase difference $\overline{\Delta \varphi_{n1}}$ used in equations 19 and 20 because the velocity is proportional to $\overline{\Delta \varphi_{n1}}$. However, the range doppler map may be needed for other processing steps and evaluations, e.g. for the calculation of the direction of arrival in multi-channel radar systems.

Finally, it is noted that the mathematical representation of the range map R[n,m] used herein should be regarded as an example and may be chosen differently in other implementations. For example, the matrix representation of the range map R[n,m], as well as of the Range/Doppler Map X[n,m], may be transposed. Furthermore, the two-dimensional representation may be converted in a one-dimensional representation dependent on the system (processor, software development tools, etc.) that is used to implement the examples described herein. The computing unit performing the FFT operations and smoothing operations described above may be integrated in the MMIC or arranged in a separate chip that may be arranged on the same circuit board or in the same radar module as the MMIC(s) that include the HF frontend(s). Generally, the term "computing unit" is used to cover any hardware or software entity or combination thereof that is suitable and configured to perform the calculations mentioned in connection with the herein described embodiments. In some embodiments the computing unit may include a digital signal processor programmed with appropriate software. However, it is noted that any digital signal processor may include hardware acceleration to perform specific calculations. For example, a chain of hardware MAC (multiply-accumulate) units may be used to perform the Fast Fourier Transform (FFT) algorithms used to calculate range maps and range doppler maps.

When used without phase correction, the interference suppression approach as described herein may be suitable for short range radar applications (radar sensors with a comparably short measurement range, e.g. up to 50 m) in which the signal power of the radar echoes is comparably high. Conventional thresholding approaches may be used alternatively or additionally in long range radar applications (radar sensors with a comparably high measurement range, e.g. 50-200 m). Generally, a combination of the interference suppression approach described herein with known thresholding techniques such as TDT or FDT may be useful for both short-range and long-range radar applications.

It is understood that the embodiments described herein may be implemented by software. Such software (e.g. a computer program) may include instructions that, when executed by a processor (e.g. DSP 40, see FIG. 3), cause the processor to carry out one or more methods according to the embodiments described herein. Such software may be stored and distributed using any computer readable medium.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

What is claimed is:

1. A method, comprising:
   receiving a plurality of chirp echoes of transmitted radar signals;
   generating a digital signal based on the plurality of chirp echoes;
   calculating a range map based on the digital signal, wherein the range map includes a plurality of values, each value of the plurality of values being represented by an amplitude value and a phase value, and each value of the plurality of values being associated with one frequency bin of a set of frequency bins and one chirp echo of the plurality of chirp echoes;
   identifying chirp echoes of the plurality of chirp echoes which are affected by interference; and
   determining, for one or more selected frequency bins of the set of frequency bins, corrected phase values based on phase values that are associated with chirp echoes of the plurality of chirp echoes not identified as affected by interference.

2. The method of claim 1, wherein identifying the chirp echoes which are affected by interference comprises:
   determining, for at least one of the one or more selected frequency bins, amplitude values that exceed a threshold level,
   wherein the chirp echoes that are associated with the determined amplitude values are identified as affected by interference.

3. The method of claim 1, wherein identifying the chirp echoes which are affected by interference comprises:
   calculating, for each chirp echo of the plurality of chirp echoes, a statistical parameter of the amplitude value associated with a respective chirp echo, wherein each chirp echo is identified as affected or not affected by interference based on the statistical parameter.

4. The method of claim 3, wherein the statistical parameter is a variance or a standard deviation.

5. The method of claim 1, wherein determining the corrected phase values comprises:
   replacing, in the range map, at least one phase value, which is associated with a chirp echo identified as affected by interference, by an estimation, and
   wherein the estimation is calculated from phase values that are associated with the chirp echoes not identified as affected by interference.

6. The method of claim 5, wherein the calculation of the estimation comprises:
   determining an average phase shift between two subsequent chirp echoes for each one of the selected frequency bins,
   wherein determining the average phase shift considers only phase values that are associated with the chirp echoes not identified as affected by interference.

7. The method of claim 5, wherein the calculation of the estimation comprises:
   determining a linear regression line based on the phase values that are associated with the chirp echoes not identified as affected by interference.

8. The method of claim 5, wherein the calculation of the estimation comprises:
   interpolating or extrapolating phase values based on the phase values that are associated with the chirp echoes not identified as affected by interference.

9. A computer program product comprising instructions which, when executed on a processor cause the processor to carry out the method of claim 1.

10. A computer-readable medium comprising instructions which, when executed on a processor cause the processor to carry out the method of claim 1.

11. A radar device, comprising:
    a radar receiver configured to receive a plurality of chirp echoes of transmitted radar signals and to generate a digital signal based on the plurality of chirp echoes;
    a computing unit, including at least one processor, configured to:
    calculate a range map based on the digital signal, wherein the range map includes a plurality of values, each value of the plurality of values being represented by an amplitude value and a phase value, and each value of the plurality of values being associated with one frequency bin of a set of frequency bins and one chirp echo of the plurality of chirp echoes;
    identify chirp echoes of the plurality of chirp echoes which are affected by interference; and
    determine, for one or more selected frequency bins of the set of frequency bins, corrected phase values based on phase values that are associated with chirp echoes of the plurality of chirp echoes not identified as affected by interference.

12. The radar device of claim 11, wherein, to identify the chirp echoes which are affected by interference, the computing unit is further configured to:
    determine, for at least one of the one or more selected frequency bins, amplitude values that exceed a threshold level, wherein the chirp echoes that are associated with the determined amplitude values are identified as affected by interference.

13. The radar device of claim 11, wherein, to identify the chirp echoes which are affected by interference, the computing unit is further configured to:
    calculate, for each chirp echo of the plurality of chirp echoes, a statistical parameter of the amplitude value associated with a respective chirp echo, wherein each chirp echo is identified as affected or not affected by interference based on the statistical parameter.

14. The radar device of claim 13, wherein the statistical parameter is a variance or a standard deviation.

15. The radar device of claim 11, wherein, to determine the corrected phase values, the computing unit is further configured to:
    replace, in the range map, at least one phase value, which is associated with a chirp echo identified as affected by interference, by an estimation, wherein the estimation is calculated from phase values that are associated with the chirp echoes not identified as affected by interference.

16. The radar device of claim 15, wherein, to calculate the estimation, the computing unit is further configured to:
determine an average phase shift between two subsequent chirp echoes for each one of the selected frequency bins, wherein, for determining the average phase shift, the computing unit considers only phase values that are associated with the chirp echoes not identified as affected by interference.

17. The radar device of claim 15, wherein, to calculate the estimation, the computing unit is further configured to:
determine a linear regression line based on the phase values that are associated with the chirp echoes not identified as affected by interference.

18. The method of claim 15, wherein, to calculate the estimation, the computing unit is further configured to:
interpolate or extrapolate phase values based on the phase values that are associated with the chirp echoes not identified as affected by interference.

* * * * *